US009460353B2

(12) United States Patent
Rankin et al.

(10) Patent No.: US 9,460,353 B2
(45) Date of Patent: Oct. 4, 2016

(54) SYSTEMS AND METHODS FOR AUTOMATED WATER DETECTION USING VISIBLE SENSORS

(75) Inventors: Arturo L. Rankin, Santa Clarita, CA (US); Larry H. Matthies, Northridge, CA (US); Paolo Bellutta, La Crescenta, CA (US)

(73) Assignee: California Institute of Technology, Pasadena, CA (US)

( * ) Notice: Subject to any disclaimer, the term of this patent is extended or adjusted under 35 U.S.C. 154(b) by 1360 days.

(21) Appl. No.: 13/235,280

(22) Filed: Sep. 16, 2011

(65) Prior Publication Data
US 2012/0070071 A1 Mar. 22, 2012

Related U.S. Application Data

(60) Provisional application No. 61/383,501, filed on Sep. 16, 2010.

(51) Int. Cl.
*G06K 9/00* (2006.01)
(52) U.S. Cl.
CPC ................................ *G06K 9/00805* (2013.01)
(58) Field of Classification Search
None
See application file for complete search history.

(56) References Cited

U.S. PATENT DOCUMENTS

| 6,504,951 B1* | 1/2003 | Luo | G06K 9/00664 382/165 |
|---|---|---|---|
| 6,512,846 B1* | 1/2003 | Luo | G06T 7/0042 382/164 |
| 2007/0159922 A1* | 7/2007 | Zimmerman | G01S 7/52004 367/103 |
| 2010/0092241 A1* | 4/2010 | Arshad | G06K 9/00651 405/52 |
| 2010/0119102 A1* | 5/2010 | Laake | G01V 9/02 382/100 |
| 2010/0263275 A1* | 10/2010 | Anderson | A01G 25/167 47/58.1 R |
| 2012/0070071 A1* | 3/2012 | Rankin | G06K 9/00805 382/154 |
| 2012/0130569 A1* | 5/2012 | Huntsberger | G08G 3/00 701/21 |

(Continued)

FOREIGN PATENT DOCUMENTS

| JP | 2006264466 | 10/2006 |
|---|---|---|
| JP | 2008179251 | 8/2008 |

(Continued)

OTHER PUBLICATIONS

Rankin, Arturo L., Larry H. Matthies, and Andres Huertas, "Daytime water detection by fusing multiple cues for autonomous off-road navigation." Jet Propulsion Lab Pasadena Ca, 2004.*

(Continued)

*Primary Examiner* — Aaron W Carter
(74) *Attorney, Agent, or Firm* — KPPB LLP

(57) ABSTRACT

Systems and methods are disclosed that include automated machine vision that can utilize images of scenes captured by a 3D imaging system configured to image light within the visible light spectrum to detect water. One embodiment includes autonomously detecting water bodies within a scene including capturing at least one 3D image of a scene using a sensor system configured to detect visible light and to measure distance from points within the scene to the sensor system, and detecting water within the scene using a processor configured to detect regions within each of the at least one 3D images that possess at least one characteristic indicative of the presence of water.

16 Claims, 17 Drawing Sheets

(56) References Cited

U.S. PATENT DOCUMENTS

| | | | | |
|---|---|---|---|---|
| 2013/0039578 | A1* | 2/2013 | Wang | G01C 11/06 382/173 |
| 2013/0147951 | A1* | 6/2013 | Brown | G01N 25/18 348/143 |
| 2014/0119639 | A1* | 5/2014 | Shah | G06T 7/0081 382/154 |
| 2014/0314270 | A1* | 10/2014 | Nguyen | G06K 9/0063 382/103 |
| 2015/0071538 | A1* | 3/2015 | Marchisio | G06K 9/4647 382/168 |
| 2015/0161881 | A1* | 6/2015 | Takemura | G06T 7/0097 348/148 |

FOREIGN PATENT DOCUMENTS

| | | |
|---|---|---|
| JP | 2009199154 | 9/2009 |
| WO | 2012037528 A2 | 3/2012 |
| WO | 2012037528 A3 | 5/2012 |

OTHER PUBLICATIONS

Rankin, Arturo, and Larry Matthies. "Daytime water detection based on color variation." Intelligent Robots and Systems (IROS), 2010 IEEE/RSJ International Conference on. IEEE, 2010.*

Rankin, A., and L. Matthies. "Daytime water detection and localization for unmanned ground vehicle autonomous navigation." Proceedings of the 25th Army Science Conference. 2006.*

Iqbal, Mohammad, Olivier Morel, and Fabrice Meriaudeau. "A survey on outdoor water hazard detection." (2009).*

Rankin, AL.; Matthies, L.H.; Bellutta, P., "Daytime water detection based on sky reflections," Robotics and Automation (ICRA), 2011 IEEE International Conference on , vol., No., pp. 5329,5336, May 9-13, 2011.*

Arturo Rankin, "Evaluating the performance of unmanned ground vehicle water detection." In Proceedings of the 10th Performance Metrics for Intelligent Systems Workshop (PerMIS '10), 305-311, 2010.*

Larry H. Matthies ; Paolo Bellutta ; Mike McHenry; Detecting water hazards for autonomous off-road navigation. Proc. SPIE 5083, Unmanned Ground Vehicle Technology V, 231 (Sep. 26, 2003).*

Santana, Pedro, Ricardo Mendonça, and José Barata. "Water detection with segmentation guided dynamic texture recognition." Robotics and Biomimetics (ROBIO), 2012 IEEE International Conference on. IEEE, 2012.*

International Search Report and Written Opinion for International Application PCT/US2011/052043, mailed Apr. 10, 2012, 7 pgs.

* cited by examiner

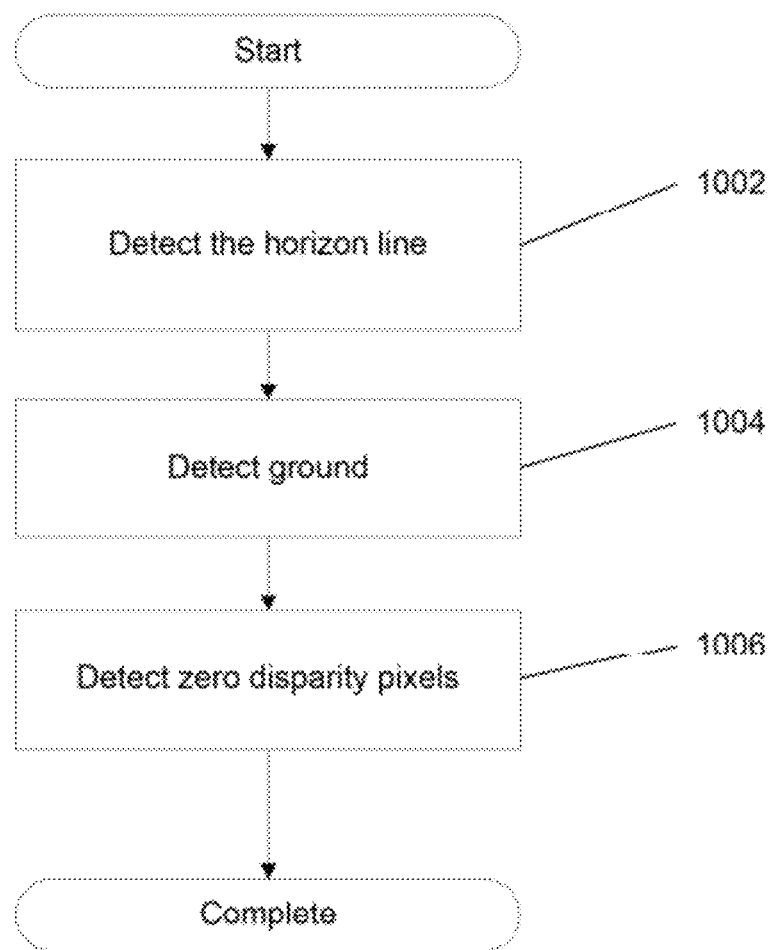
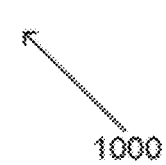
FIG. 10

SYSTEMS AND METHODS FOR AUTOMATED WATER DETECTION USING VISIBLE SENSORS

CROSS-REFERENCE TO RELATED APPLICATIONS

The current application claims priority to U.S. Provisional Application No. 61/383,501, filed Sep. 15, 2010, the disclosure of which is incorporated herein by reference.

STATEMENT OF FEDERALLY SPONSORED RESEARCH

This invention described herein was made in the performance of work under a NASA contract, and is subject to the provisions of Public Law 96-517 (35 U.S.C. 202) in which the Contractor has elected to retain title.

FIELD OF THE INVENTION

The present invention generally relates to automated water detection and more specifically to an automated water detection system using a 3D imaging system.

BACKGROUND OF THE INVENTION

Bodies of water can become a significant hazard when navigating over terrain. Vehicles designed for terrestrial use, such as a car or truck, can be damaged when traversing through bodies of water. The ability for systems to automatically detect water through automated machine vision presents a unique challenge. Additionally, the ability to distinguish between merely water detected on the ground and a water hazard presents a further difficulty. Machine vision is the automated capture and processing of one or more images of a scene to detect features indicative of the scene. Machine vision is especially important for unmanned ground vehicle autonomous navigation systems as unmanned vehicles depend heavily upon machine vision for navigation over terrain.

Stereo cameras are a type of 3D image capture device with one or more separate image sensors that allow for multiple images to be captured of the same scene from different perspectives. By capturing images from different perspectives, the images captured by stereo cameras can be used to determine the distance between the camera sensor and features of a scene by reconciling the differences between the images captured by the multiple image sensors using the distance between each image sensor or from a single image sensor using the distance between the image sensor in two or more positions.

Cameras can capture many features of a scene. A color camera can capture the color in a scene as part of an image. Colors in an image can be represented as RGB images with the RGB color model in which colors in an image are represented as a combination of red, green and blue light. RGB images can be converted to a hue, saturation and value (HSV) color space. Conceptually, the HSV color space can be represented as a cone. The circumference of the circle is represented by hue values from 0 to 360 degrees on the circle side of the cone. Saturation and value (or brightness) have values of 0-1. Saturation can be represented by the distance from the center of the circle. Brightness can be represented by the distance along the vertical axis of the cone. The pointed end of the cone represents black or the absence of brightness. All colors are at their maximum brightness at the circle end of the cone.

SUMMARY OF THE INVENTION

Systems and methods in accordance with embodiments of the invention includes autonomously detecting water bodies within a scene including capturing at least one 3D image of a scene using a sensor system configured to detect visible light and to measure distance from points within the scene to the sensor system; and detecting water within the scene using a processor configured to detect regions within each of the at least one 3D images that possess at least one characteristic indicative of the presence of water.

A further embodiment includes filtering out false positives of the detected water by configuring the processor to avoid erroneous detections.

In another embodiment, the erroneous detections comprise detecting water not on level ground.

A still further embodiment includes localizing the detected water by configuring the processor to aggregate water detections.

In a still another embodiment, aggregating water detections includes aggregating at least one detected water body on an image; finding an elevation for each detected water body; and fusing each detected water body to a horizontal plane at the elevation.

In a still further embodiment, the at least one characteristic indicative of the presence of water is at least one of sky reflections, object reflections or color variations.

A still another embodiment includes detecting water within the scene using a processor configured to detect regions within each of the at least one 3D images that possess color variations including: detecting the horizon line in each of the at least one 3D images; detecting the ground in each of the at least one 3D images; detecting at least one low texture region with a monochrome intensity above a monochrome intensity threshold on the ground; expanding the low texture regions where the intensity gradient is at an expansion threshold; fitting each low texture region to a shape approximating the outline of a body of water encompassing the low texture region; and line fitting the pixels within each low texture region for lines representing the changes in color levels with varying distances from the ground to the sensor in both saturation and brightness.

A yet further embodiment includes thresholding the line fitting for differences between the saturation and the brightness lines for the rates of change in color level with varying distance on the ground from the sensor.

A yet another embodiment includes thresholding at least one of: size of the low texture regions; type of the shape approximating the outline of a body of water; pixel density within the shape; dimensions of the shape; slope of the lines from line fitting of the pixels in each low texture region; or error of the line fitting of the pixels in each low texture region.

In a further embodiment again, at least one of: the expanding the low texture regions is performed by flood filling; the shape approximating the outline of a body of water is shaped as an ellipse; and the line fitting is performed by least squares line. fitting.

Another embodiment again includes detecting water within the scene using a processor configured to detect regions within each of the at least one 3D images that possess sky reflections including: detecting the horizon line in each of the at least one 3D images; detecting the sky in each of the at least one 3D images; detecting the ground in each of the at least one 3D images; and comparing pixels from the ground to pixels in the sky.

Another additional embodiment includes thresholding a degree of similarity between the compared ground and sky pixels.

In a still yet further embodiment, comparing pixels from the ground to pixels in the sky includes: averaging the lower sky pixels in each image column; and scanning for pixels on the ground for color that is similar to the averaged sky color.

In a still yet further embodiment, the comparing pixels from the ground to pixels in the sky includes: geometrically locating pixels in the sky that pixels on the ground can be reflecting; and comparing the pixels on the ground to the corresponding pixels in the sky for similarity.

In a still yet another embodiment, detecting water within the scene using a processor configured to detect regions within each of the at least one 3D images that possess object reflections includes: detecting the horizon line in the at least one 3D images; detecting the ground in the at least one 3D images; detecting inflection points on the ground; and detecting object reflection end pixels on the ground.

In a still further embodiment again, detecting water within the scene using a processor configured to detect regions within each of the at least one 3D images that possess object reflections includes: detecting the horizon line in the at least one 3D images; detecting the ground in the at least one 3D images; and detecting zero disparity pixels on the ground.

In still another embodiment again, detecting water within the scene using a processor configured to detect regions within each of the at least one 3D images that possess object reflections includes: inverting a pixel blob of the at least one 3D images; and cross correlating the inverted pixel blob with any other pixel blob above the inverted pixel blob.

In still further additional embodiment, detecting water within the scene using a processor configured to detect regions within each of the at least one 3D images that possess object reflections includes: detecting the horizon line in each of the at least one 3D images; detecting the ground in each of the at least one 3D images; detecting at least one range void on the ground; determining a horizontal plane fit for each range void's perimeter points; and filtering out portions of each range void that extend beyond the distance detected in the trailing edge of the range void's horizontal plane fit.

In still another additional embodiment, a method of autonomously detecting water bodies within a scene includes: capturing at least one 3D image of a scene using a sensor system configured to detect visible light and to measure distance from points within the scene to the sensor system; detecting water within the scene using a processor configured to detect regions within each of the at least one 3D images possessing color variations, wherein detecting water further comprises: detecting the horizon line in a plurality of the at least one 3D images; detecting the ground in a plurality of the at least one 3D images; detecting at least one low texture region with a monochrome intensity above a monochrome intensity threshold on the ground in at least one of the 3D images; flood filling the low texture regions where the intensity gradient is at an expansion threshold; fitting each low texture region to an ellipse approximating the outline of a body of water encompassing the low texture regions; least squares line fitting the pixels in each low texture region in saturation and brightness from certain color levels at varying distance on the ground from the sensor; and filtering out false positives of the detected water by configuring the processor to avoid detecting water not on level ground; and localizing the detected water by configuring the processor to aggregate water detections.

In a still further additional embodiment again, a system for autonomously detecting water bodies within a scene includes: a sensor system configured to capture at least one 3D image of a scene, wherein the sensor system is configured to detect visible light and to measure distance from points within the scene to the sensor system; and a processor configured to detect water within the scene by detecting regions within each of the at least one 3D images that possess at least one characteristic indicative of the presence of water.

A still another additional embodiment again includes a terrain mapping system configured to store a map of terrain featuring detected water and to determine a safe path over the terrain avoiding detected water hazards using the map of the terrain.

BRIEF DESCRIPTION OF THE DRAWINGS

FIG. 10 illustrates a process for automated water detection based upon zero disparity stereo reflection detection of object reflections in accordance with an embodiment of the invention.

DETAILED DISCLOSURE OF THE INVENTION

Figure 1:
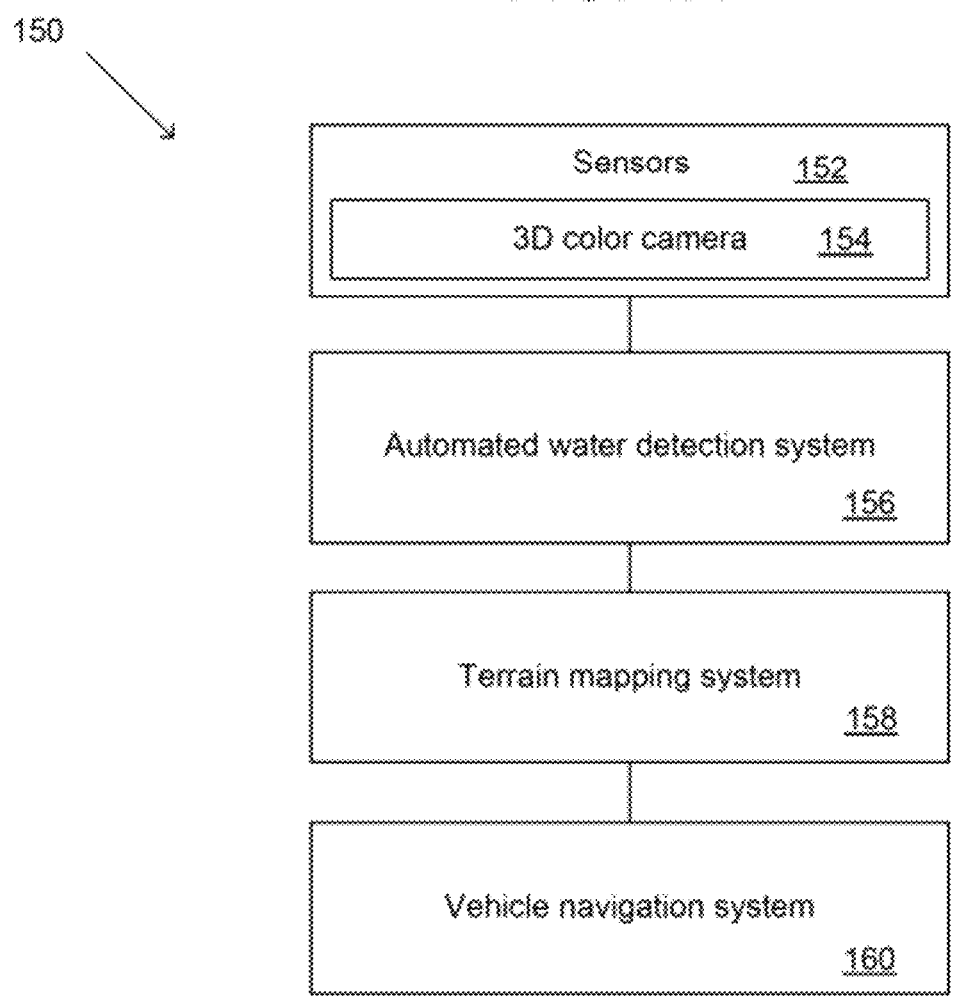
FIG. 1A is a block diagram of a water detection system implemented in hardware with memory in accordance with an embodiment of the invention.
FIG. 1B is a block diagram of a water detection system configured for use by a vehicle navigation system in accordance with an embodiment of the invention.

Turning now to the drawings, automated machine vision processes that utilize images of scenes captured by a 3D imaging system configured to image light within the visible light spectrum to detect water in accordance with embodiments of the invention are illustrated. Common 3D imaging system configured to image light within the visible light spectrum, such as (but not limited to) passive stereo visible sensors, can be utilized to avoid the complication and expense related to the integration of specialized sensors for water detection into an autonomous vehicle navigation system. Utilization of passive sensors also enables as little disturbance of the environment as possible, enabling stealthy detection of water bodies in unknown or changing terrain where discovery of the automated water detection system is not desired. In many embodiments, the water in a scene can be further processed to detect water hazards for avoidance when navigating over terrain. Due to the automated nature of water hazard detection, systems and methods in accordance with embodiments of the invention can be easily integrated into unmanned ground vehicle autonomous navigation systems over cross country terrain.

In various embodiments, automated water detection includes the ability to detect candidate water, filter out candidate water false positives and to localize candidate water for increased accuracy. The ability to further process detected candidate water for false positives and localization of candidate water allows for greater accuracy which is especially useful for applications where the application demands that water detection be rendered accurately in real time for immediate usage by a navigation system. In certain embodiments, additional processing to ensure multiple positive detections of the same water body across images of a scene gives an additional layer of security to increase the likelihood that water is accurately detected. The robust nature of this automated water detection allows for water detection systems in accordance with embodiments of the invention to be deployed for a variety of applications ranging from real time detection from a unstable platform on an unmanned ground vehicle over bumpy terrain to rapidly changing environments that can hamper the effectiveness of sensors such as a rapidly changing scene captured during the turning of a vehicle or a dynamic environment where particles such as dust or rain may interfere with the sensors. In many embodiments, systems and methods in accordance with embodiments of the invention can be augmented with active sensors such as Light Detection and Ranging (LIDAR) systems that can actively measure distances in a scene, for example by using lasers.

In numerous embodiments, a variety of processes are used for water detection. Each process is custom tailored for the different environments where water can be detected. Certain processes can be utilized for water detection based upon sky reflections, which are effective when water is still at a distance away from the water detection sensors. Other processes can be utilized for water detection based on color variations from water, such as the variation in color from the leading edge to trailing edge of water, which is useful for detecting water at close range and takes advantage of unique characteristics of water bodies compared with other features in a given scene, such as water's characteristic trend of water saturation and brightness relative to incidence angle or distance away from the water detection sensors. Still other processes can be utilized for water detection based upon object reflections, which are especially capable for detecting water in cluttered environments in which reflections of objects upon the water give dominant cues as to the presence of a water body. Individually, each process for automated water detection is effective in detecting water. However, the processes described above and/or alternative or additional processes can be utilized in combination to take full advantage of the tailored aspects of water detection for different environments where water can be detected. Furthermore, processes can be utilized to cross check and/or confirm water detection, such as where sky and object reflections can be combined for a better understanding of water in a partially cluttered environment or where multiple detections are indicative of further accuracy in water detection.

Systems and methods for robust automated water detection utilizing sensors configured to image the visible light spectrum in accordance with embodiments of the invention are described in further detail below.

Water Detection Systems

An automated water detection system can be implemented in hardware and/or a combination of hardware and software and used in a variety of applications involving water detection. A block diagram of an automated water detection system in accordance with an embodiment of the invention is illustrated in FIG. 1A. The automated water detection system 100 includes a computer program stored in memory 102 capable of configuring a processor 104 to implement methods for automated water detection. In the illustrated embodiment, the automated water detection capability can simply be applied to any system as a component of the system that is utilized for performing water detection. In many embodiments, the automated water detection system is capable of receiving data, often an image or images concerning a scene, and the processor of the automated water detection system is configured by software stored in memory to detect water in a scene based upon one or more received images or sets of images.

An automated water detection system can be coupled with sensors and a terrain mapping system and integrated into a system for automated vehicle navigation. A block diagram illustrating a water detection system integrated with a system for vehicle navigation in accordance with an embodiment of the invention is illustrated in FIG. 1B. The system 150 includes sensors 152, such as a 3D color camera 154 or passive stereo cameras. The sensors 152 are connected with an automated water detection system 156 and the automated water detection system 156 is connected with a terrain mapping system 158. The terrain mapping system 158 is connected with a vehicle navigation system 160.

In many embodiments, the sensors 152 include a common passive stereo color camera capable of taking color images as well as distance measurements of a scene. These cameras are passive, indicating that they have a minimal impact on the environment and are therefore stealthier than active sensors such as LIDAR sensors. The cameras are often also cheaper and easier to replace than custom cameras designed for water detection. Furthermore, the usage of common color cameras in stereo is versatile as a simple color camera can be put to many uses beyond water detection such as transmission of images for immediate viewing by a human operator. Although passive stereo color cameras are utilized in many embodiments of the invention, any of a variety of 3D imaging systems that are capable of capturing both image and depth information of a scene can be utilized. In additional embodiments, a 3D color camera 154 can generate raw color images from color cameras for processing by the water detection system 156 real time stereo ranging software as a frontend to water detection and localization. In other embodiments, processing of 2D image data into 3D image data can occur on the sensors 152 or as part of a 3D color camera 154.

In further embodiments, the sensors 152 can also include vehicle position such as in latitude, longitude, elevation, and zone data and/or orientation such as roll, pitch, yaw angles data. This data can be used to place detected water in local and global maps at the correct location. In certain embodiments, this data is typically obtained from an inertial measurement unit (IMU) or inertial navigation system (INS), in combination with a global positioning system (GPS) receiver.

In numerous embodiments, a terrain mapping system 158 can also be utilized by the automated water detection system 156 such as where detected water bodies are used to populate water bodies on a map. A vehicle navigation system can utilize a terrain map populated with water bodies for navigation, or avoidance of water classified as a water hazard as detected from the terrain map.

Figure 2:
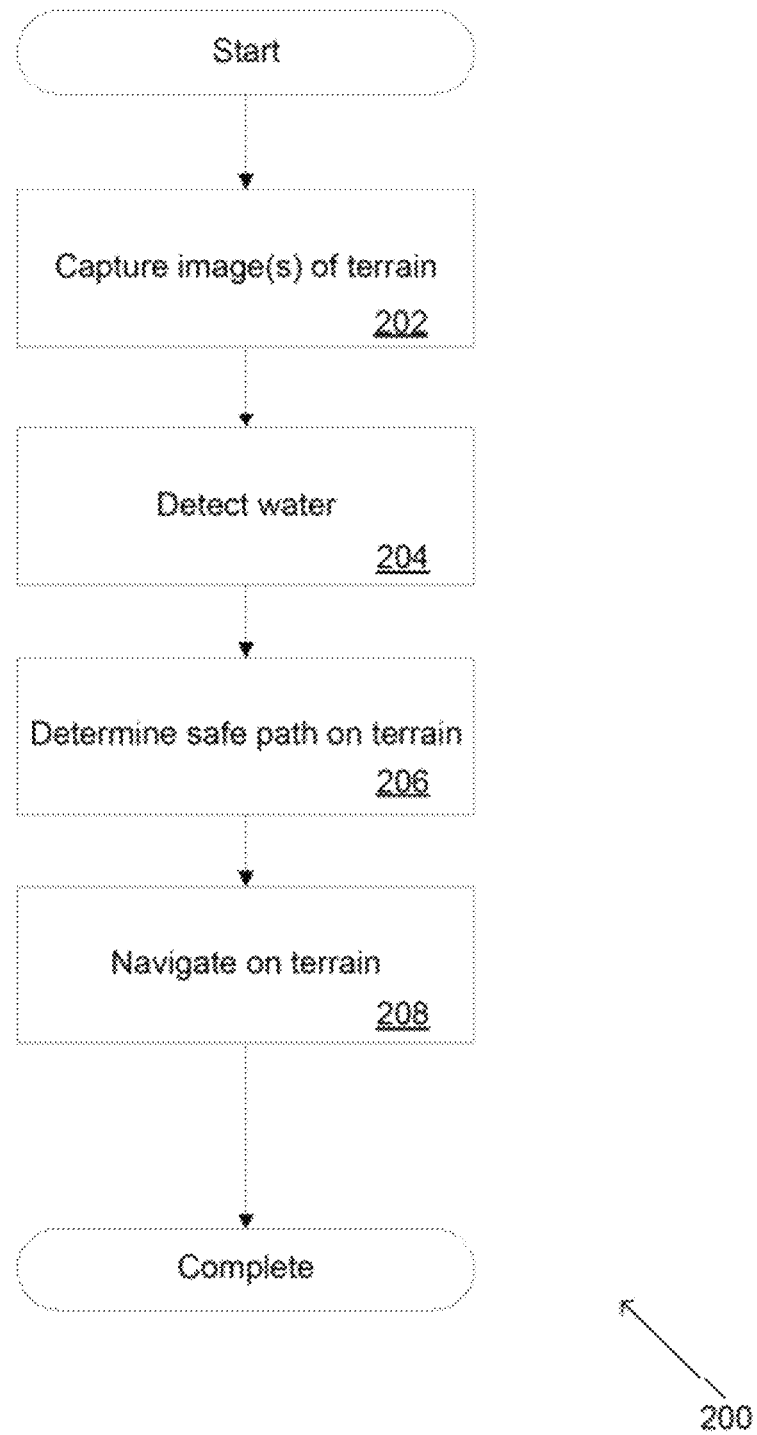
FIG. 2 illustrates a process for detection of water on a terrain map configured for use in autonomous vehicle navigation in accordance with an embodiment of the invention.

Numerous methods of automated water detection can be implemented in various applications, including for navigation in systems including (but not limited to) the system illustrated in FIG. 1B. An autonomous navigation process incorporating a process for automated detection of water in accordance with an embodiment of the invention is illustrated in FIG. 2. The process 200 includes capturing (202) image(s) of terrain. After capturing (202) images of terrain, water is detected (204) in the terrain by performing automated water detection upon the captured images. After detecting (204) water, a safe path on the terrain is determined (206) that avoids detected water hazards. After determining (206) a safe path, safe terrain navigation is implemented (208) that avoids detected water hazards. In certain embodiments, the automated water detection also utilizes vehicle pose data to determine the orientation of the vehicle and sensors relative to the terrain and stereo ranging data to determine distances from the sensor to features of the terrain. Water detection can be implemented as part of a single automated water detection system integrating sensors and associated software configured to operate within hardware to navigate a vehicle over terrain while avoiding water hazards. Similarly, the process of FIG. 2 can be implemented upon a system similar to the system illustrated in FIG. 1B such as where capturing (202) images of terrain can be implemented by sensors 152, detecting (204) water can be implemented by an automated water detection system 156, determining (206) a safe path on the terrain can be implemented by a terrain mapping system 158 and navigation on terrain (208) can be implemented by a vehicle navigation system 160.

Although specific implementations of water detection systems and methods are discussed above, other implementations can be utilized in accordance with many embodiments of the invention such as detecting water purely for the purpose of mapping without navigation or to discover the status of water on the ground after rainfall. Methods for robust automated water detection with features to enhance the accuracy of detected water in accordance with embodiments of the invention are discussed in further detail below.

Water Detection Process

Figure 3:
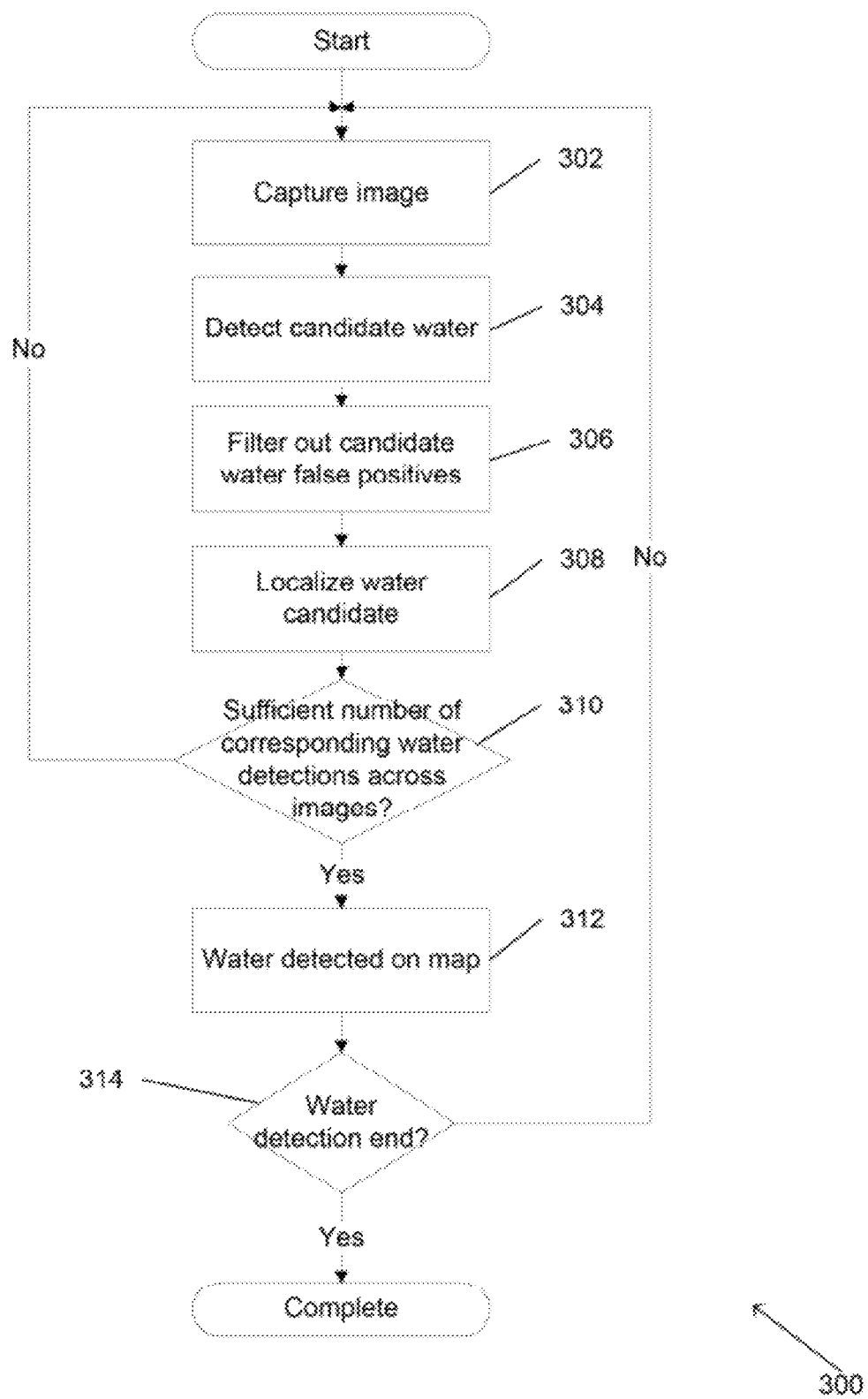
FIG. 3 illustrates a process for automated water detection on a terrain map across images of a captured scene in accordance with an embodiment of the invention.

Water detection processes in accordance with embodiments of the invention are capable of robust detection of water beyond merely detecting candidate water bodies but also can filter out false positives and localize candidate water bodies for enhanced accuracy. Accurate water detection can be further ensured by utilizing multiple images for a cross comparison of water body detection before confirming detection to prevent non-accurate detections based on errors in the image. A process for robust automated water detection with features that can increase the accuracy of water detection in accordance with an embodiment of the invention is illustrated in FIG. 3. The process 300 includes capturing (302) an image of a scene. After capturing (302) the image, candidate water is detected (304). After detecting (304) candidate water, candidate water false positives are filtered out (306). After filtering out (306) false positives, the water bodies are localized (308). After localizing (308) the water, a decision (310) is made as to whether a sufficient number of corresponding water detections have been made across several images of the same scene for accurate water detection. If there is an insufficient number of corresponding water detections, the process loops back to capture (302) an image of a scene. If there is a sufficient number of corresponding water detections, the process confirms (312) that water is detected. In certain embodiments, confirmation can include applying the detected water to a terrain map. After confirmed (312) water detection, a decision (314) is made as to whether the water detection has ended. If the water detection is not yet ended, then the method loops back to capturing (302) an image of a scene. If the water detection has finished, then the process is complete.

In many embodiments, image capture is performed by a color stereo camera capable of taking a color image of a scene along with associated information about distance to objects in the scene from the sensor. In certain embodiments, sensors are capable of detecting un-occluded liquid water bodies on the surface of the ground but in additional embodiments may detect other types of water bodies. Detection of candidate water can be made with a variety of water detection processes that are described in further detail below. Filtering out candidate water false positives and localization of water candidates are both discussed further below.

In various embodiments, a decision is made concerning whether a sufficient number of corresponding water detections have been made across images of a common scene. In a number of embodiments a predetermined number of detections, such as (but not limited to) at least two confirmed detections of the same (or substantially similar) water bodies within successive images of a scene. Likewise, a threshold of a sufficient number of corresponding water detections can be required such as at least a detection of a common body of water by two different detection processes. In many embodiments, water bodies are detected based upon a single image. Likewise in further embodiments that detect water in a single image, water detection can be confirmed after a plurality of water detection processes detect the same water body to enhance the accuracy of water detection.

In various embodiments, water detection involves confirmation after filtering out candidate water false positives, localizing water candidates and with a sufficient number of corresponding water detections across images of a scene. These confirmed water bodies can be plotted upon a map of the scene captured by the images or even the terrain surrounding the water sensor as discovered by storing maps of the scenes surrounding the water sensor as new terrain is discovered. These confirmed water detections can contain information relating the distance the water is from the sensors and elevation of the water relative to the sensors.

In numerous embodiments, water detection systems are turned on by a user or automatically turned on by a vehicle navigation system in embodiments applied for vehicle navigation. The water detection system can continuously process input images until turned off by an operator. Likewise in embodiments applied for vehicle navigation, the water detection system can continuously process input images and vehicle pose data until turned off by an operator or when the vehicle navigation system is shut down.

Figure 4:
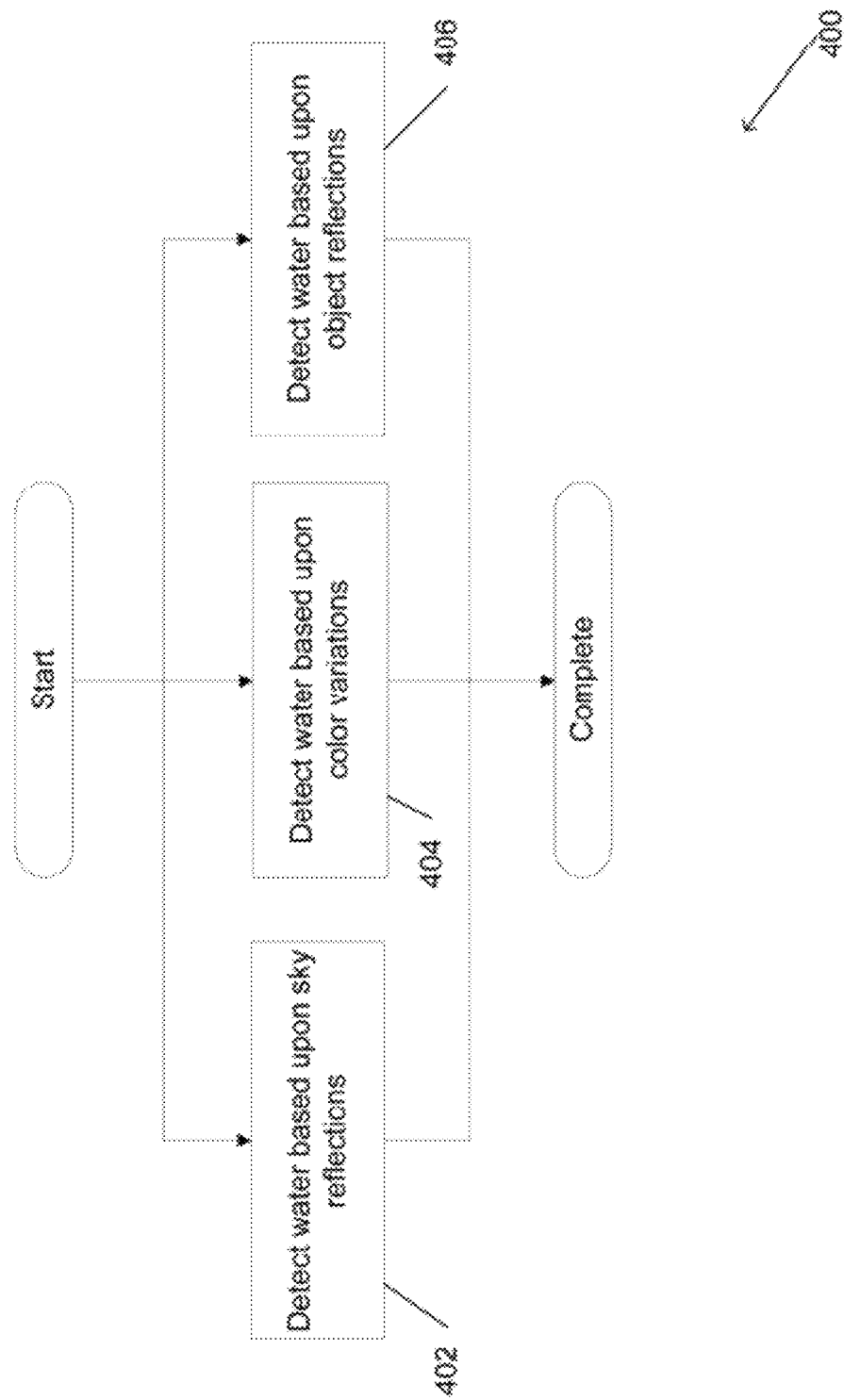
FIG. 4 illustrates a process for automated water detection that detects candidate water hazards based upon sky reflections, color reflections or object reflections in accordance with an embodiment of the invention.

Water detection processes in accordance with embodiments of the invention can be tailored to perform effectively in each of the specific environments that water can be detected. These environments can include water detected far from the sensor in open ground, water detected that is close to the sensor and water detected in cluttered environments, such as environments where various objects such as trees, shrubs, or elevated ground above the water body clutter the sensor's field of view. Specifically, water detection based upon sky reflections is effective to detect water that is far from the sensor on open ground. Likewise, water detection based upon color variations is effective to detect water that is close to the sensor and is particularly effective for detecting water on open ground that is close to the sensor. Also, water detection based upon object reflections is effective to detect water in cluttered environments. FIG. 4 illustrates a process tailored to detect water in the specific environments that water can be detected. The process 400 includes simultaneously running processes to detect water based upon sky reflections (402), color variations (404) and object reflections (406) to ensure accurate results tailored to detect water in a variety of environments.

Although specific environments and methodologies for detecting water are discussed above, a multitude of environments and methodologies can be applied to detect water in accordance with many embodiments of the invention. Further discussion of these methods for detecting water, including specific embodiments of each method are discussed further below.

Water Detection Based Upon Color Variation

Figure 5A:
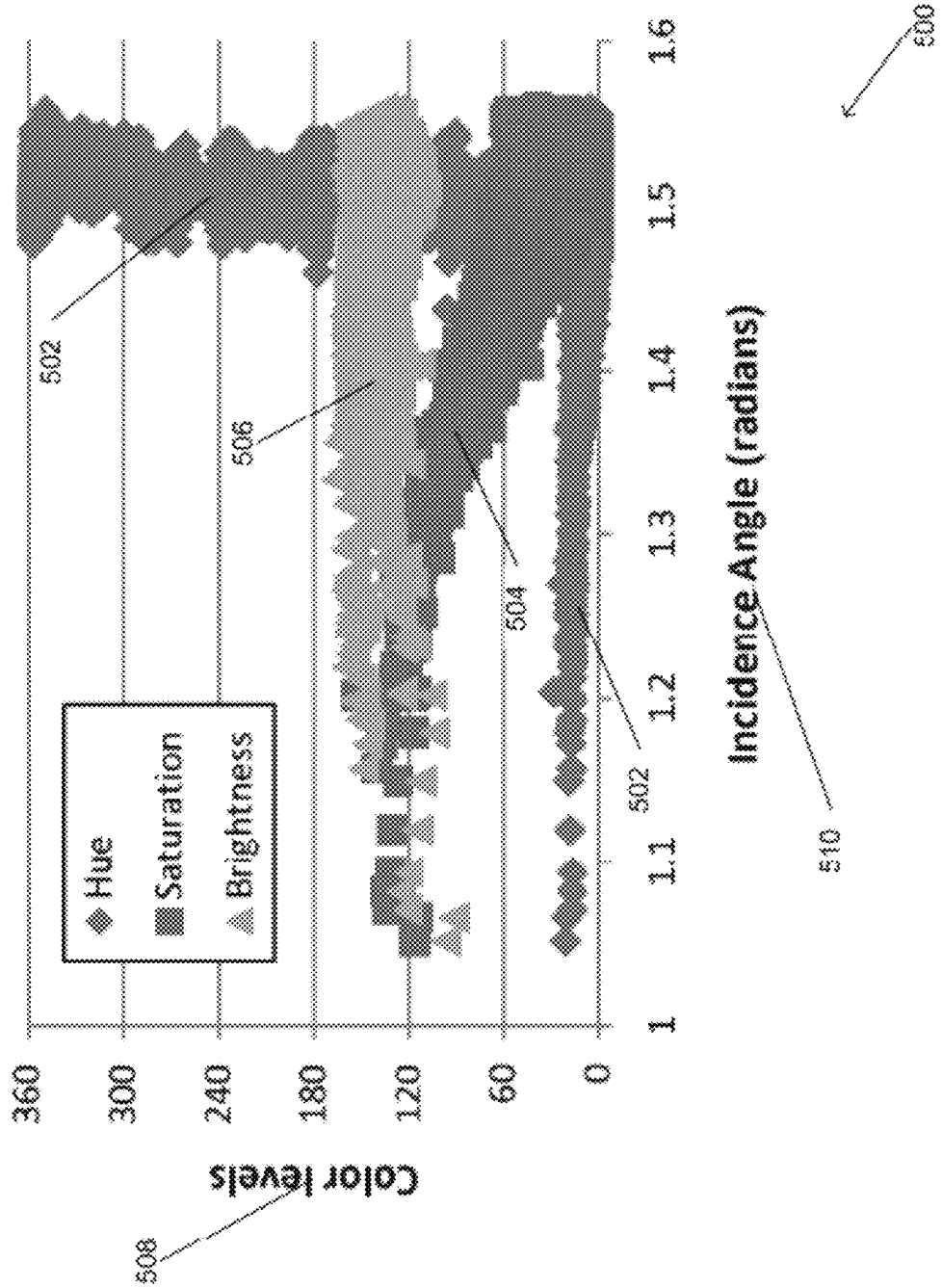
FIG. 5A is a graph illustrating a set of experimental results representative of the trends of hue, saturation and brightness when plotted against color levels and incidence angle.
Figure 5B:
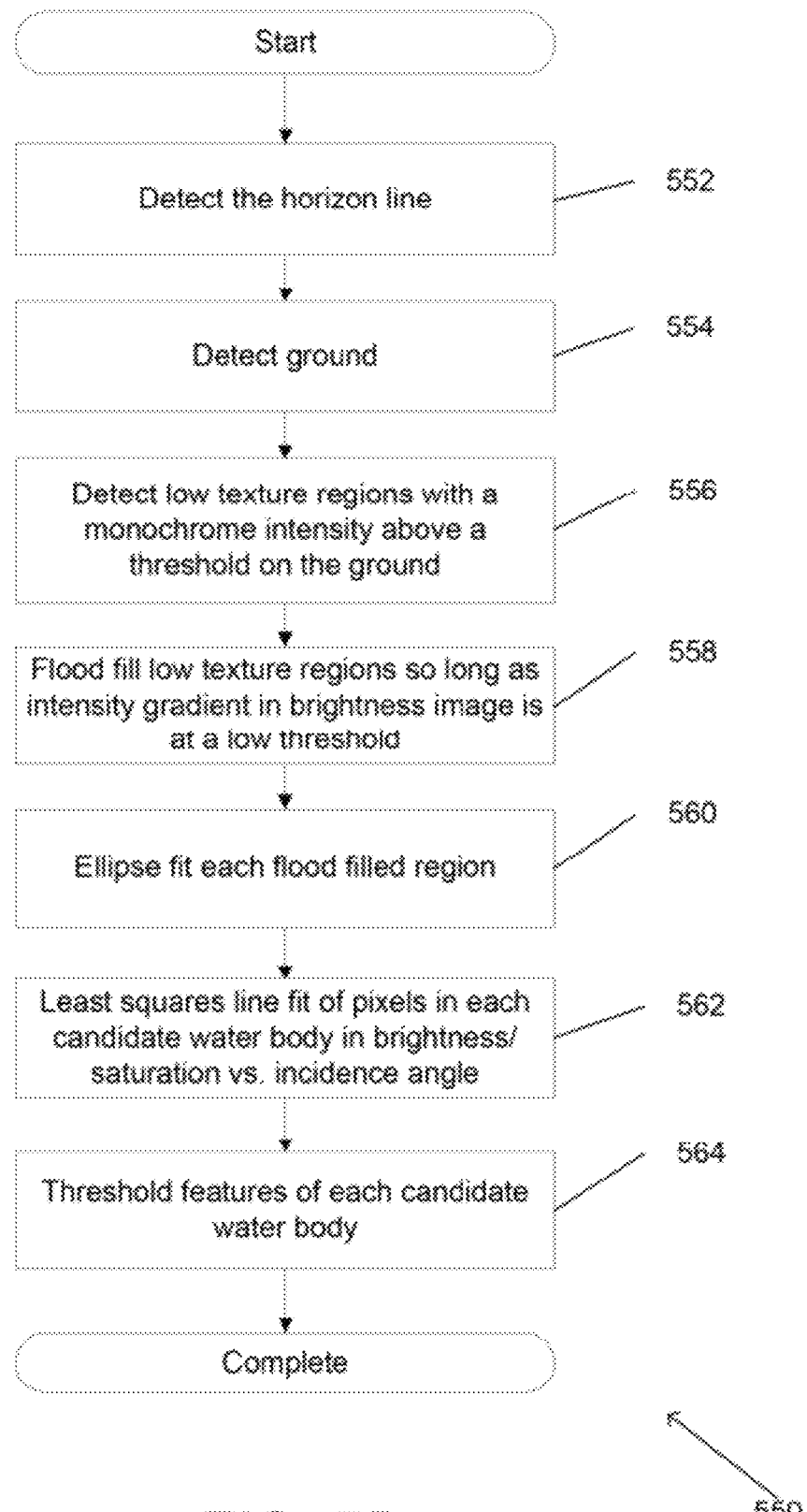
FIG. 5B illustrates a process for automated water detection based upon color variation in accordance with an embodiment of the invention.

A variety of different processes can be utilized for water detection in specialized environments. Water detection based on color variations takes advantage of unique characteristics of water that become more distinctive the closer a water body is to the sensor. Generally, water detection based upon color variation looks at variations in the color coming out of a water body to detect the water body. FIG. 5A illustrates the opposite trends of saturation and brightness with different incidence angles. From experimental results plotted in a representative figure 500 of hue 502 saturation 504 and brightness 506 in color levels 508 against incidence angle 510, it is found that the components of saturation 504 and brightness 506 trend in opposite directions at different incidence angles 510, or distances from the sensor to the water being analyzed. Certain embodiments can take advantage of detecting change in the saturation/brightness ratio (or brightness/saturation ratio) across a water body from the leading edge to the trailing edge as the change can be uniform and distinct from other terrain types such as soil and grass. Furthermore, water detection based upon color variation can take a number of other cues including low texture and a high density of pixels indicative of detected water in a candidate water body. In this way, detection of bodies of water proximate a color sensor configured to image the visible light spectrum can be performed by an automated water detection system in accordance with embodiments of the invention. A process for water detection based upon color variation that takes advantage of the unique characteristics of color from a water body is illustrated in FIG. 5B. The process 550 begins with detecting (552) the horizon line in an image. After the horizon line is detected (552), ground can be detected (554). After detecting ground (554), low texture regions with a monochrome intensity above a threshold on the ground are detected (556). These detected low texture regions can be flood filled (558) so long as the intensity gradient in the brightness image is at a low threshold. After flood filling (558), each flood filled region is ellipse fitted (560) and a least squares line fit (562) of pixels in each candidate water body, which at this stage can be each flood filled low texture region and/or region ellipse fitted, in brightness/saturation vs. incidence angle is plotted. After fitting/plotting (562) the brightness/saturation vs. incidence angle data, thresholding (564) begins on features of the image, such as features of the pixels and ellipses fitted to the pixels on to determine a candidate water body.

In many embodiments, a horizon line is a line in an image that separates the ground from the sky. A discussion of detecting the horizon line in an image is provided below. In numerous embodiments, the ground is the portion of the image that water bodies can exist and is generally restricted to below the horizon line. In certain embodiments, the calculation of the horizon can output a horizon vector, which indicates which row contains the horizon for each column of the image. Water is searched upon the ground by analyzing an image one column at a time starting at the row that contains the horizon.

In several embodiments, low texture regions with a monochrome intensity above a threshold can be indicative of water. Water surfaces are generally of low texture, uniform and have a higher monochrome intensity as light tends to be more reflective off water than other objects on the ground. In certain embodiments, low texture regions are located by converting the native RGB images to grayscale and passing a 5×5 (or similar) intensity variance filter over the grayscale images to filter out values of higher intensity. These low texture regions can be flood filled so long as the intensity gradient in the brightness image is at a low threshold consistent with the reflective and low texture nature of water. Flood filling generally causes the pixels surrounding a low texture pixel, or region including pixels, to be included in that low texture region so long as the threshold for the surrounding pixels is satisfied. Ellipse fitting of each flood filled region includes fitting each flood filled region to an ellipse for ease of processing. In certain embodiments, flood fill regions have irregular shapes and a best fit ellipse can be applied where most of the flood filled region is contained within the ellipse, but some parts of the flood filled region can spill outside of the ellipse. A least squares line fit of pixels in each candidate water body, which can be each flood filled low texture region or ellipse fitted region, in brightness/saturation vs. incidence angle can be made as well. The least squares line fit can be applied to generate a line that is the best fit to data that minimizes the sum of squared residuals, which are the difference between the actual value of data and the value of data given by the fitted line. Thresholding can be applied to a number of features of this analyzed image, including (but not limited to) thresholding the density of candidate water pixels in an ellipse, the length and width of each ellipse in meters, the average error of pixels for the least squares line fit, the slope of the least squares line fit of saturation and brightness of certain color levels as mapped against the incidence angles, the ellipse aspect ratio, the number of pixels and/or the length and width of the pixels in bodies without ellipse fitting.

Although specific examples of water detection based upon color variation are given above, water detection based upon color variation can be implemented in many additional different ways in accordance with many embodiments of the invention. Many embodiments of water detection based upon color variations utilize detection of a horizon line. Horizon line detection in accordance with many embodiments of the invention are discussed further below.

Horizon Line Detection

In various embodiments, a horizon line is typically a line across the image that demarcates the ground in which water can be detected and the sky. In certain embodiments, the search for the ground is limited to the region below the horizon line and the search for the sky is limited to the region above the horizon line. In this way, the computational cost of water detection and the probability of false detections are reduced as there will be no detections of water bodies in the sky.

In certain embodiments in a forward looking imaging sensor mounted to an unmanned ground vehicle (UGV), the line of sight distance to the horizon can be approximated as $[H(2R+H)]^{0.5}$, where H is the height of the sensor above the ground surface and R is the mean radius of the earth (6,371 km) modeled as a sphere. For a sensor height of 1.5 meters, the line-of-sight distance to the horizon is approximately 4,372 meters. The true horizon line may be detectable in color imagery under a limited set of conditions, for example, the earth's surface in the distance is barren terrain or water, there is no sun glare, and changes in a UGV's pitch angle are not causing the horizon line to move outside of the camera's field of view (FOV).

In other embodiments, if a model of the sensor's optical characteristics is known, including its orientation from an onboard inertial sensor, the horizon line can be directly calculated without having to search for it within an image. Calculating the horizon line from sensor optical characteristics and camera attitude data can work even when the earth's surface in the distance is obstructed with natural or man-made structure, sun glare, or large changes in a sensor's pitch angle.

In numerous embodiments, the horizon line can be approximated as the line of intersection between the camera image plane and the horizontal plane that lies on the optical center of the camera lens. The actual horizon line depends on the effective camera height above ground level, which can vary significantly on open terrain. As will be described in equations below, to approximate the line of intersection, it is easy to calculate the intersection point of the camera image plane with two arbitrary horizontal vectors, $q_1$ and $q_2$, originating at the optical center as illustrated in equation (1). These two image points, $(c_1, r_1)$ and $(c_2, r_2)$ define the horizon line on the camera image plane as illustrated in equation (2).

The approximation is easily achieved by using the vectors of a standard linear photogrammetric model for a pinhole camera such as a CAHV camera model. C is the coordinate of the camera optical center, A is the optical axis extending out of the optical center, and H and V are the vectors of the horizontal and vertical components of the camera image plane, respectively. The camera model is typically measured relative to flat ground. During certain applications such as operation as part of an UGV, the camera model needs to be transformed into a vehicle frame every imaging cycle using inertial sensor attitude data. However, this transformation may already be performed at every imaging cycle to generate 3D coordinates from stereo matching for a stereo camera and therefore there may be no additional computational cost to the system. Equations relating the horizontal vectors, $q_1$ and $q_2$, originating at the optical center and image points, $(c_1, r_1)$ and $(c_2, r_2)$ that define the horizon line on the camera image plane are below in equations (1) and (2).

$$q_1 = \{-A[0], -A[0], 0\}$$

$$q_2 = \{-A[0], A[0], 0\} \quad (1)$$

$$r_1 = (V \cdot q_1)/(A \cdot q_1)$$

$$c_1 = (H \cdot q_1)/(A \cdot q_1)$$

$$r_2 = (V \cdot q_2)/(A \cdot q_2)$$

$$c_2 = (H \cdot q_2)/(A \cdot q_2) \quad (2)$$

Continuing with an embodiment of sensors as a camera as part of a UGV, the horizon line may lie outside the camera field of view (FOV) for extreme positive or negative values of vehicle pitch or pan-tilt unit (PTU) tilt angles. Although this embodiment utilizes a camera as a pan-tilt unit, cameras in accordance with embodiments of the invention can be mounted in any way that allows for scanning of terrain for water, increasing the water detection system's field of regard, or all of the points of a physical environment that can be perceived by the camera at a given moment. As shown in equation (3), the expected error E in horizon line estimation is a function of the sensor height H, the radius of the earth R, the camera's vertical angular resolution IVFOV, the inertial sensor's pitch accuracy ($\gamma_{inertial}$), and the tilt resolution of the PTU ($\gamma_{PTU}$), if one is used to actively point the camera.

$$E = \frac{\sin^{-1}\left[\frac{H}{\sqrt{H(2R+H)}}\right] \pm \gamma_{inertial} \pm \gamma_{PTU}}{IVFOV} \quad (3)$$

Although specific examples of horizon detection are given above, horizon detection can be implemented in many different ways depending upon the requirements of a specific application in accordance with embodiments of the invention. The detection of a horizon line is related not only to detection of the ground but also the detection of the sky, such as water detection based upon sky reflections in accordance with embodiments of the invention as discussed below.

Water Detection Using Sky Reflections

Figure 6A:
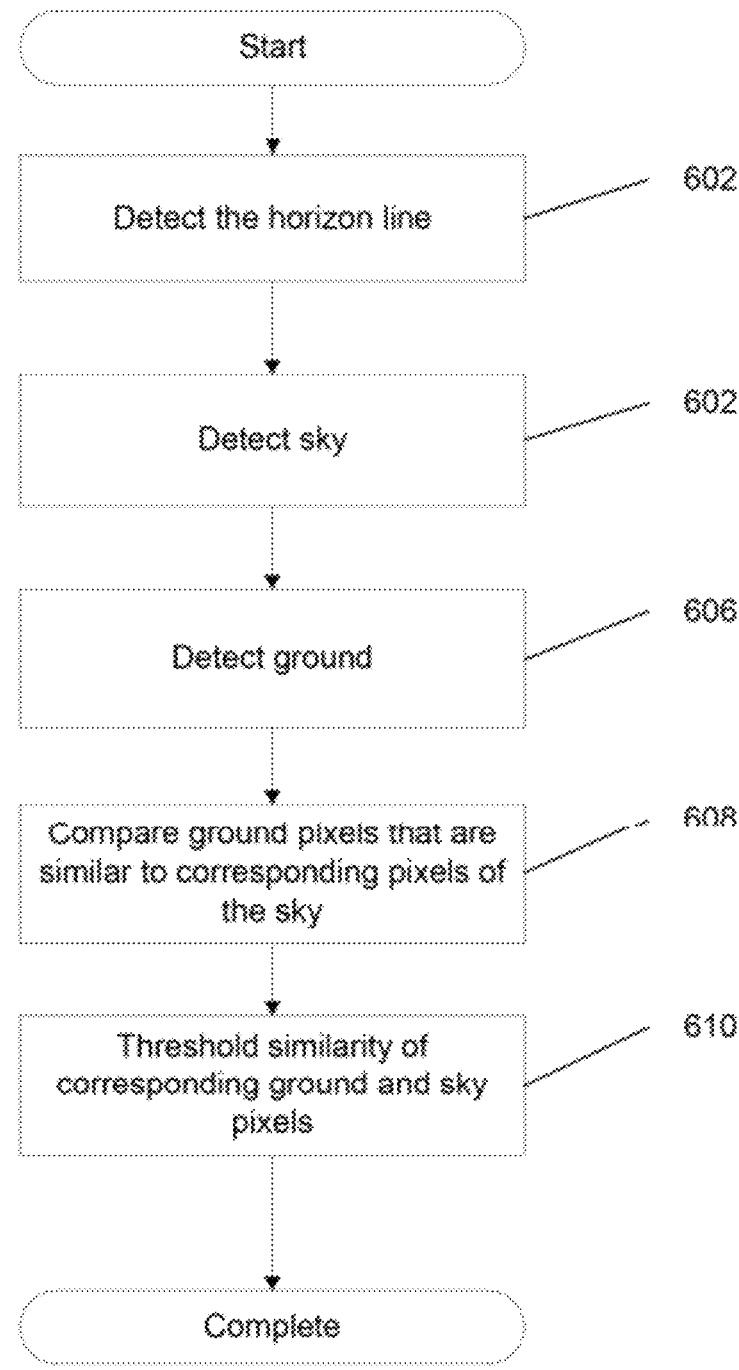
FIG. 6A illustrates a process for automated water detection based upon sky reflections on water in accordance with an embodiment of the invention.

Sky reflections can give strong cues to the presence of water in certain environments. Water generally has a reflective property where light is reflected off bodies of water more easily than other surfaces such as rock. In certain instances, this effect is similar to a mirror in which the scene above the water is reflected off the water. Taking cues from sky reflections can entail noting indications of reflective properties on a ground surface indicative of water. A process for water detection based upon sky reflections on water bodies in accordance with an embodiment of the invention is illustrated in FIG. 6A. The process 600 includes detecting (602) the horizon line. After the horizon line is detected (602), the sky is detected (604). After detecting (604) the sky, the ground is detected (606), and ground pixels that have similarities, such as similar color or texture, to corresponding pixels of the sky are compared (608). Similarities between the ground and sky pixels can then be thresholded (610) to detect reflections indicative of the presence of water.

In various embodiments, as discussed above, a horizon line is found in an image that demarcates the sky from the ground. In the illustrated embodiment, the sky is detected before the ground is detected but in other embodiments the ground may be detected before a detection of the sky. Sky detection will be detailed in further below.

In numerous embodiments, the ground pixels that have similarities, including a similar color or other features to corresponding pixels in the sky can be compared and the similarity between the ground and sky pixels can be thresholded. This generally entails looking at whether pixels on the ground and pixels in the sky are of the same or similar hue and if the features of the pixels on the sky are similar to the pixels on the ground, such as if one is merely an inverted reflection of the other. The appearance of water bodies in color imagery can depend on the ratio of light reflected off the water surface to the light coming out of the water body. When a water body is far away, the angle of incidence is large, and the light reflected off the water surface dominates the color coming out of the water body. In many embodiments, water bodies can be detected in wide-open areas based on sky reflections. In certain embodiments utilizing a color 3D image sensor with left and right stereo color cameras, sky detection can be performed on the left camera with rectified color imagery. The color of the lower sky pixels in each image column can then be averaged, and each image column below the horizon scanned for colors that were a close match to the averaged sky color. In additional embodiments utilizing a color 3D image sensor with left and right stereo color cameras, candidate water pixels are segmented in left rectified color imagery based on color and texture, then the exact pixel in the sky reflecting on each candidate water pixel is geometrically located, and then difference in color is thresholded.

Figure 6B:
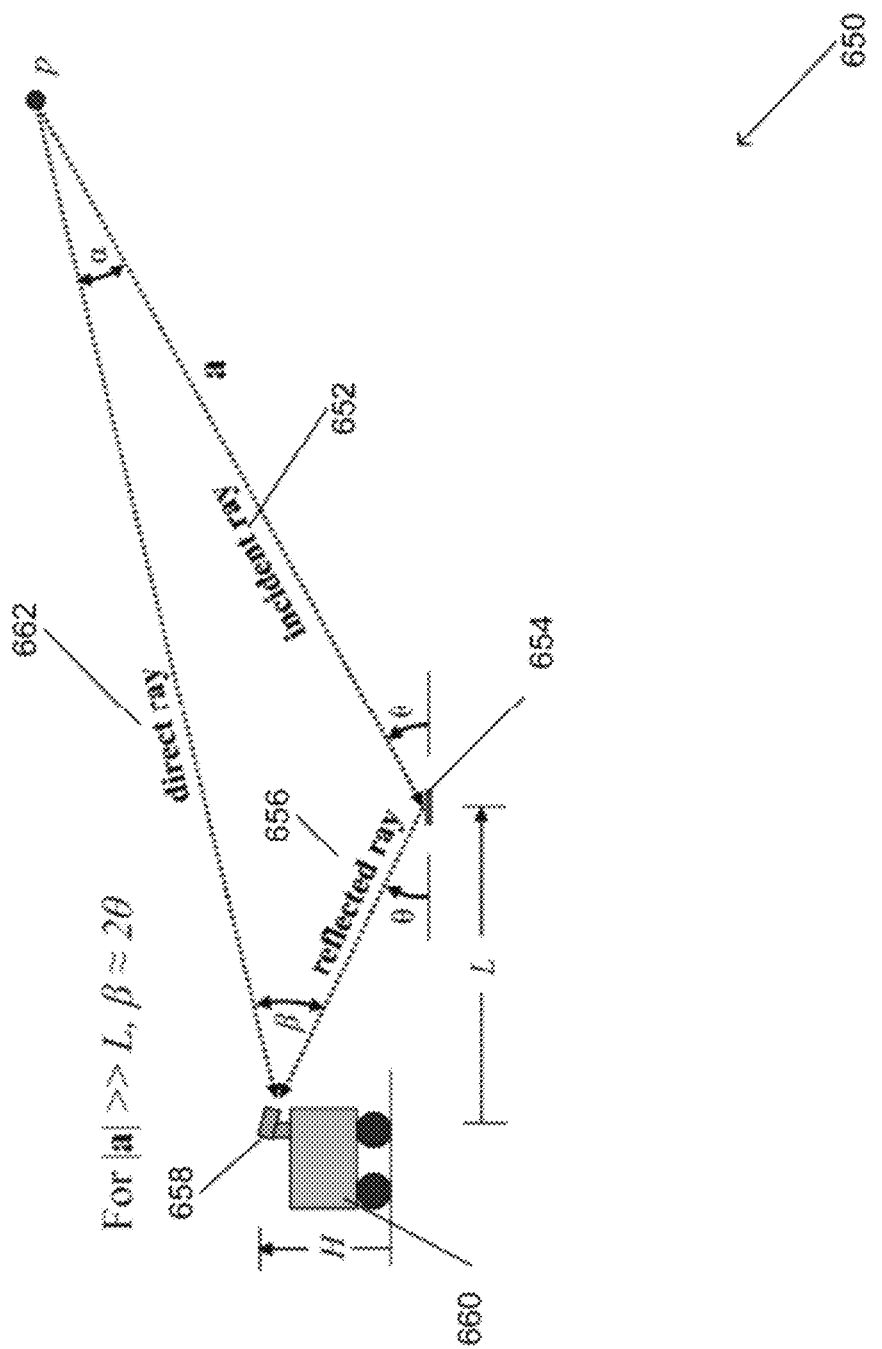
FIG. 6B illustrates the geometric relationship of light that arrives directly to a sensor from a point p and that arrives indirectly to a sensor from the point p via a reflection in water.

Geometric location includes the detection of the scene that a body of water is reflecting. A water body can be modeled as a horizontal mirror. FIG. 6B illustrates the geometry where a point p is directly detected by a sensor on a vehicle platform at height H and is indirectly detected by the sensor from a reflection off of a water body at a distance L horizontally away from the sensor. In the geometric illustration 650, a ray of light travels along an incident ray 652, is reflected off the surface of a water body 654 along a reflected ray 656, and enters a pixel of a camera's 658 focal plane array (FPA). Here, the camera is located around the top of the vehicle 660. According to the law of reflection, the angle of incidence is equal to the angle of reflection. A direct ray 662 from the tail of the incident ray (and within the same vertical plane as the incident ray) will enter the camera's FPA at a pixel whose color will indicate the color of the sky being reflected along the reflected ray.

Since the distance between the camera and the light source is much larger than the distance between the camera and candidate water points at normal detection ranges, the direct ray and the incident ray will be nearly parallel and the angle between the direct ray and the reflected ray can be approximated as two times the glancing angle as illustrated in the equations in (4) as illustrated below.

$$\beta + (\pi - 2\theta) + \alpha = \pi \qquad (4)$$
$$\lim_{|a| \to \infty} \alpha = 0$$
$$\beta \approx 2\theta$$

The calculations to locate the pixel within an image corresponding to a direct ray are as follows. For any candidate water pixel, the 2D image coordinates can be converted to a 3D unit vector in a coordinate frame where the z axis is aligned with gravity, the z component of the unit vector is negated, and the modified unit vector is converted to 2D image coordinates.

As illustrated in FIG. 6B, when a candidate water point is far away, the glancing angle θ is small and the sky pixel reflecting on the candidate water pixel is close to the horizon. When a candidate water point is close to the camera 658, the glancing angle is large and the sky pixel reflecting on the candidate water pixel is closer to the top of the image, or possibly outside the top of the FOV.

Although specific examples of water detection utilizing sky reflections are discussed above, many additional implementations of water detection sky reflections can be utilized based upon the requirements of specific applications in accordance with embodiments of the invention. Sky reflection techniques involve detection of the sky to compare between the ground and sky portions of an image. Further discussion of sky detection in accordance with embodiments of the invention follows.

Sky Detection

Sky detection in accordance with many embodiments of the invention generally entails initially detecting a horizon line above which the search for the sky is constrained. The amount of an image that constitutes the sky can vary with different scenes. For example, a cluttered scene where trees or elevated ground can block the sensor's view of the sky can involve a complex search for portions of the image above the horizon line corresponding to the sky. In many images, the color of a water body that is in the open (i.e. not adjacent to elevated terrain or objects that cause reflections in the body of water) and far away from the sensors of an automatic water detection system typically closely matches the color of the sky. Therefore, it is useful to locate the sky in input imagery for color determination. The color of the sky depends upon atmospheric conditions. The main source of light in the sky is the sun, but light from atmospheric scattering and reflections off clouds is also emitted by the entire sky dome.

In several embodiments, cues useful for classifying the sky in color imagery are saturation-to-brightness ratio, monochrome intensity variance, and edge magnitude. In certain embodiments, detection of an overcast sky tends to have a combination of generally higher image saturation, lower saturation-to-brightness ratio, low variance, and/or low edge magnitude. In other embodiments, detection of a clear sky can include detecting a combination of generally high blue content, low variance, and/or low edge magnitude. In still other embodiments, detecting a cloudy sky can include generally a low saturation-to-brightness ratio. In many embodiments, the edge magnitude of an image can be thresholded to find the lower bound of the sky.

Figure 7:
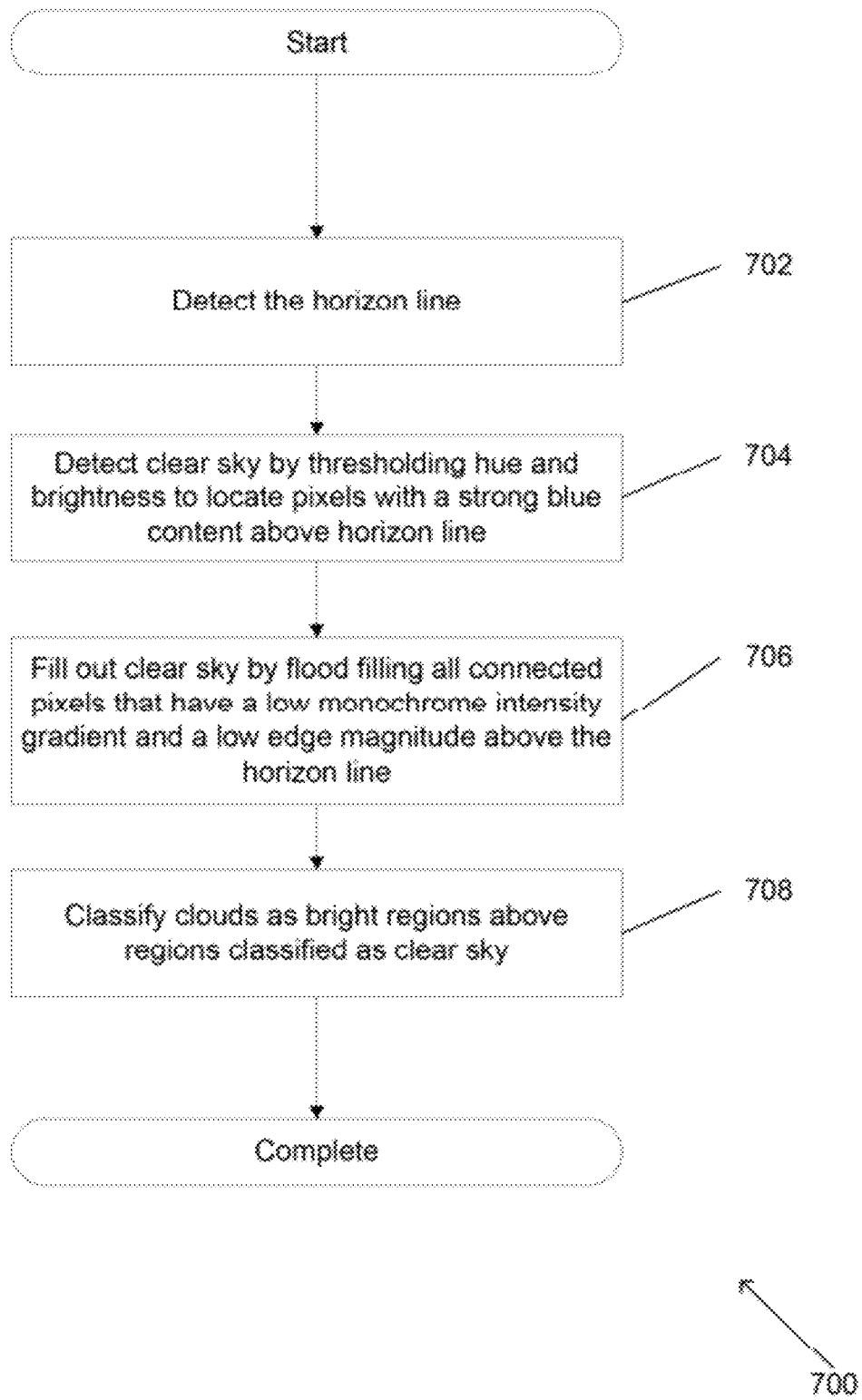
FIG. 7 illustrates a process for sky detection of a clear sky as well as detection of clouds in accordance with an embodiment of the invention.
Figure 8:
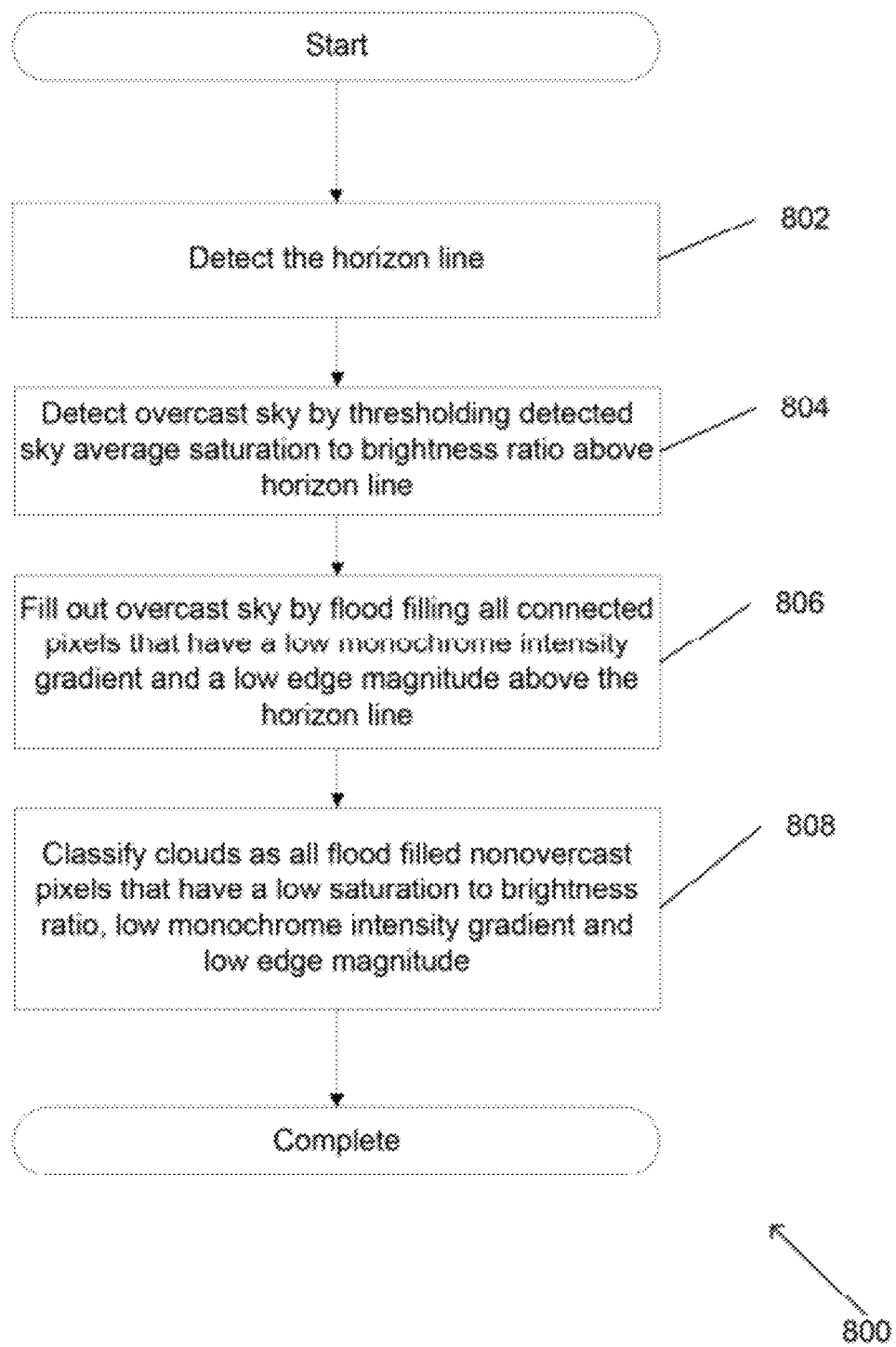
FIG. 8 illustrates a process for sky detection of an overcast sky as well as detection of clouds in accordance with an embodiment of the invention.

Many different processes can be utilized in embodiments of the invention for detection of the sky including processes that are targeted to specific sky conditions such as (but not limited to) a clear sky, overcast sky and/or a cloudy sky. FIG. 7 illustrates a process for sky detection that involves detecting regions of clear sky in accordance with an embodiment of the invention. The process 700 includes detecting (702) the horizon line. After detecting (702) the horizon line, clear sky is detected (704) by thresholding hue and brightness components of the image to locate pixels with a strong blue content above the horizon line. After detecting (704) clear sky, the amount of clear sky in an image is detected (706) by flood filling all connected pixels that have a low monochrome intensity gradient and a low edge magnitude above the horizon line. After detecting (706) the amount of clear sky, clouds are classified (708) as bright regions above regions that are classified as clear sky. Similarly, sky detection for a cloudy sky in accordance with embodiments of the invention is illustrated in FIG. 8. The process 800 includes detecting (802) the horizon line. After detecting (802) the horizon line, overcast sky is detected (804) by thresholding the detected sky average saturation to brightness ratio above the horizon line. Once overcast sky is detected (704), the amount of overcast sky in the image is filled out (806) by flood filling all connected pixels that have a low monochrome intensity gradient and a low edge magnitude above the horizon line. After detecting (806) the amount of overcast sky, clouds are classified (808) as all flood filled non-overcast pixels that have a low saturation to brightness ratio, low monochrome intensity gradient and low edge magnitude.

Although specific examples of sky detection are given above, many additional implementations of sky detection can be utilized as appropriate to the requirements of specific applications in accordance with embodiments of the invention. In addition to water detection utilizing color variations and sky reflections, water detection can be performed using processes that utilize object reflections. Water detection processes that detect water by detecting object reflections in accordance with embodiments of the invention are detailed below.

Water Detection Using Object Reflections

Object reflections can provide strong cues for the detection of water in cluttered environments. Cluttered environments are scenes in which there are a significant number of objects whose images reach above the horizon line and obscure the portion of the image that would otherwise be classified as sky or objects that would reflect off a body of water where the reflection would otherwise have been a reflection of the sky. Object reflections can be from naturally occurring objects (e.g. vegetation, trees, hills, mountains, clouds) or man-made entities (e.g. signs, poles, vehicles, buildings, bridges). Object reflections can also be detected using range detectors or active sensors including (but not limited to) LIDAR range sensors to detect objects in the scene that might cause object reflections in bodies of water that are also present in the scene. A variety of techniques can be utilized to detect water from object reflections in accordance with many embodiments of the invention. In a number of embodiments, water detection is performed using stereo reflection detection, cross correlation reflection detection and/or map based reflection detection. Stereo reflection detection can take advantage of a reflective feature of water where distance measured from object reflections in a body of water by a sensor are often far greater than the distance measured by the sensor for the surrounding environment of the water body. In many embodiments, stereo ranging, performed on images from a pair of color cameras, outputs a range image that can be used to detect reflections of objects. Object reflections extend from the trailing edge of a water body and can span a portion or all of the water body, depending upon the reflected object's height and distance from the water. The range to the reflection of an object should roughly matches the range to the object, however, the reflection range data lies below the ground surface.

Figure 9A:
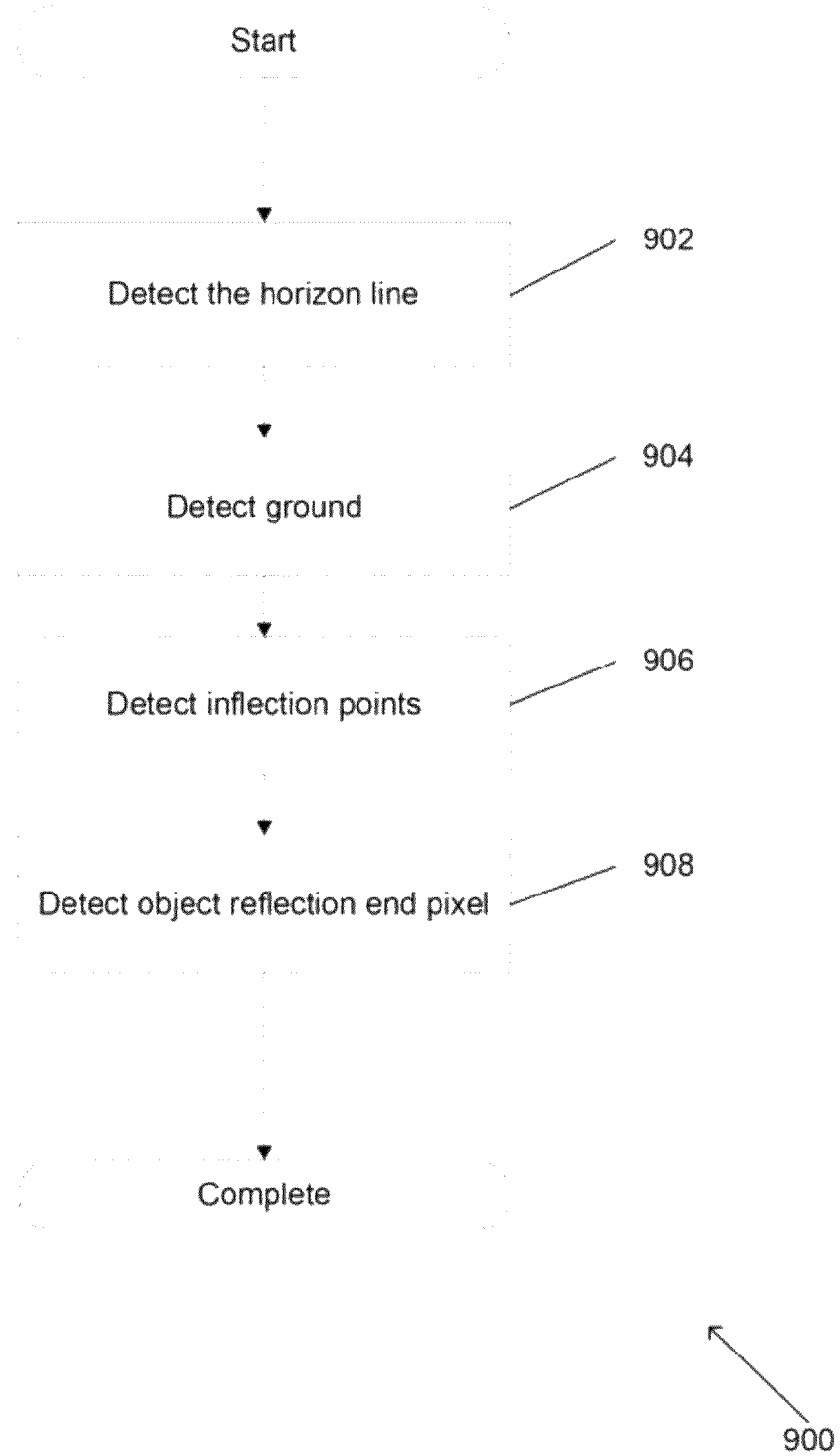
FIG. 9A illustrates a process for automated water detection based upon 3D reflection detection, such as stereo reflection detection, of object reflections in accordance with an embodiment of the invention.

A stereo reflection detection process in accordance with an embodiment of the invention is illustrated in FIG. 9A. The process 900 includes detecting (902) the horizon line. After the horizon line is detected (902), the ground is detected (904), and inflection points are detected (906). Object reflection end pixels are detected (908) Inflection points and object reflection end pixels are discussed further detail below.

Figure 9B:
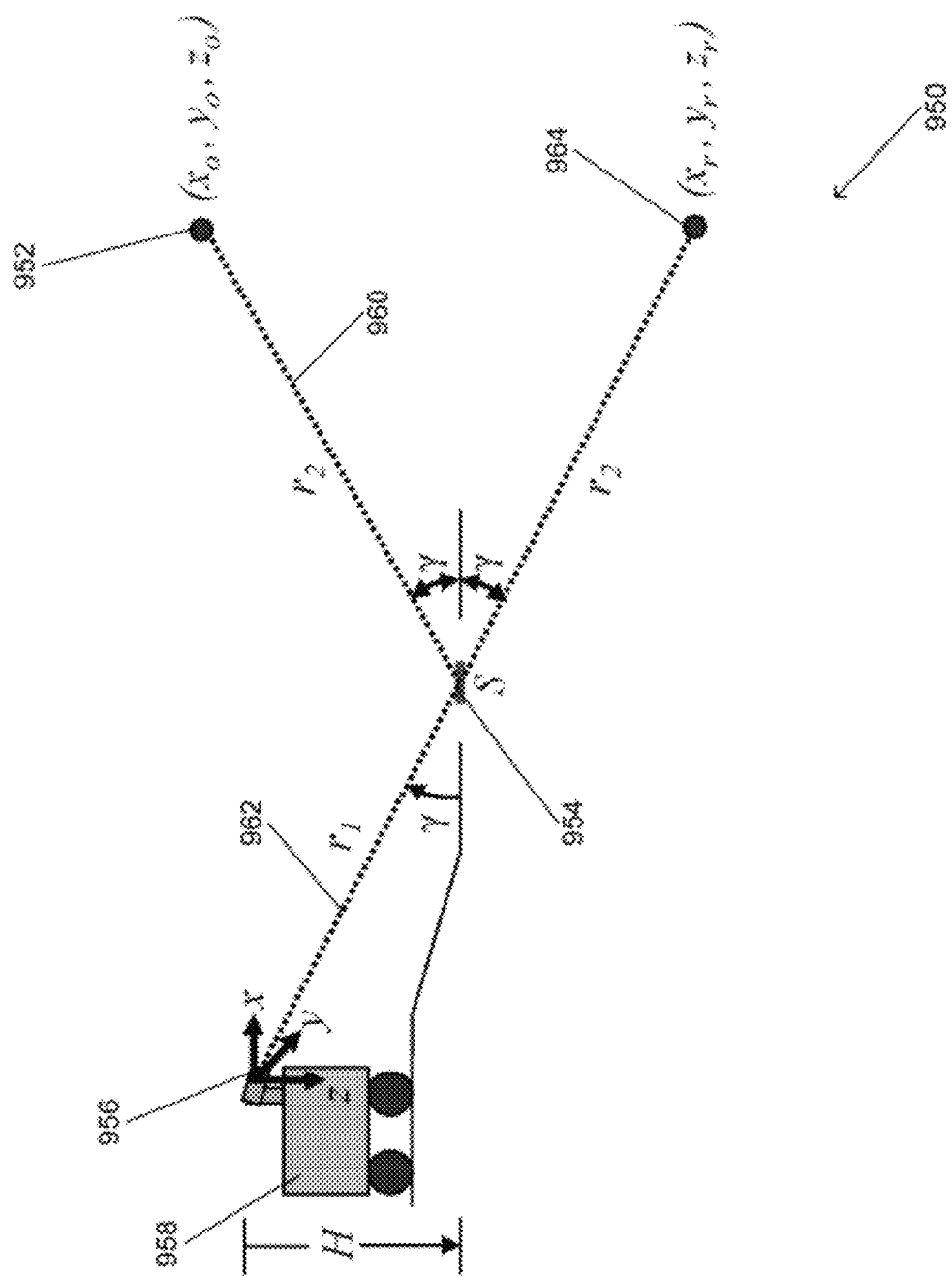
FIG. 9B illustrates the geometric relationship of a sensor detecting an object indirectly from a water surface reflection but associating a distance measurement for that object from the sensor as a straight line to the reflection for a total distance including both the distance from the object to the reflection and from the reflection to the sensor in accordance with an embodiment of the invention.

In many embodiments, the surface of water can be modeled as a horizontal mirror. A diagram illustrating the 3D geometric relationship between a point object and its reflection in stereo range data as detected by a sensor on top of a vehicle in accordance with an embodiment of the invention is illustrated in FIG. 9B. Although certain embodiments recite sensors mounted on top of a vehicle, sensors could be placed anywhere on a vehicle above the ground as long as parts of the vehicle are not obstructing the sensors field of view in other embodiments employing a vehicle with a sensor used for detecting water. One the cameras are mounted, they are calibrated so its location and orientation with respect to the vehicle positioning sensor is precisely know.

Specifically, the diagram 950 illustrates the 3D geometric relationship between a point object $(x_o, y_o, z_o)$ and its reflection $(x_r, y_r, z_r)$ in stereo range data. A point object 952 and its reflection 954 (such as a reflection on water) lie in the same vertical plane defined by the sensor 956 azimuth angle θ. Here, the sensor 956 sits around the top of a vehicle 958. Likewise, equation (5) illustrates that geometric relationship between the point object 952 and its reflection as seen by the sensor 956 on the vehicle 958. A ray of light from a point object 952 travels along an incident ray 960, is reflected off the surface of a water body along a reflected ray 962, and enters a pixel of a camera's 956 focal plane array (FPA). According to the law of reflection, the angle of incidence is equal to the angle of reflection. If the distance to the point object is $r_1$ along the reflected ray plus $r_2$ along the incident ray, the reflection of the point object will occur in stereo range data at a distance $(r_1+r_2)$ along the reflected ray. Given the 3D coordinates of the point object $(x_o, y_o, z_o)$ and an estimate of the water's elevation H with respect to the left camera FPA, o the expected 3D coordinates of the reflection $(x_r, y_r, z_r)$ can be calculated.

$$x_r = x_o$$

$$y_r = y_o$$

$$z_r = 2H - z_o \qquad (5)$$

Theoretically, the stereo range to a reflection is equivalent to the distance a ray of light travels from the reflected object to the sensor. As illustrated in FIG. 9B, the 3D coordinates of stereo reflections 964 lie below the ground surface.

In many embodiments, ground is evaluated by analyzing the range data associated with the pixels of an image, or a range column, of the ground one row at a time starting at the horizon line searching downwards. Where reflections meet the trailing edge of a water body, there is a drastic change in the range profile. When stepping down a range image column, an inflection point occurs when range data moves away from the sensors underneath the ground surface by an angle and magnitude that exceed thresholds. Thereby, an inflection point is a point in an image where the reflection range data and the trailing edge border of a water body meet as reflections begin at inflection points at the trailing edge water/ground interface.

In several embodiments, a detectable trailing edge water bank is also utilized when performing stereo reflection detection. A least squares line fit of the range data above the candidate inflection point pixel is performed. In certain embodiments, this range data for inflection point detection is thresholded to within a range of 0.15 times the inflection point range. Additionally, the candidate inflection point can be accepted when the estimated trailing edge line must has an incline less than 40 degrees and an average error of less than 30 cm.

An object reflection end pixel is located when either the data moves back past the candidate inflection point (towards the sensors) to a point close to the ground surface, or the bottom of the column is reached. If the analysis of a column detects distance from the sensor as moving back to a point close to the ground as opposed to the reflection, a significant gap between the reflection data and end point is required. In certain embodiments, candidate inflection points having an elevation higher than the ground surface below the vehicle by more than 1 meter are rejected. All pixels between a detected inflection point and end pixel are labeled as a stereo reflection pixel.

In addition to actually detecting the distance of reflections, reflections that indicate an extremely high distance to an object on the ground can also be indicative of a reflection of water on the ground in accordance with many embodiments of the invention. Reflections found by stereo cameras from a great distance can be detected as zero disparity between the individual cameras of a stereo system. Zero disparity occurs when the stereo correlator of a stereo camera matches pixels in the same column in rectified left and right images for a stereo camera with a left and right camera. In certain embodiments, stereo range images do not specifically encode where zero disparity pixels occurred. Rather, a "no data" flag is encoded which can occur for several reasons. Thereby, a disparity failure image can be used to extract the locations of zero disparity pixels.

A process for water detection based upon detecting zero disparity pixels in accordance with an embodiment of the invention is illustrated in FIG. 10. The process 1000 includes detecting (1002) the horizon line. After detecting (1002) the horizon line, the ground is detected (1004), and zero disparity pixels are also detected (1006). The zero disparity pixels are then thresholded for indicia of water. In several embodiments, the zero disparity and stereo reflection water cues are complementary. That is, zero disparity pixels and the stereo reflection detector do not explicitly locate the same reflection pixels. Although zero disparity pixels are utilized to detect water in the illustrated embodiment, zero disparity pixels are not used directly to detect water in other embodiments, but rather to increase the confidence of detected water by other water detection processes.

Another indicator of an object reflection includes cross correlation between parts of an image, indicating that there is a reflection. Reflections of objects can be detected in an intensity image by performing cross correlation. In embodiments utilizing a stereo left and right camera, cross correlation is used to locate where there is a "mirror image" within a rectified left camera image, which is registered with the corresponding stereo range image, enabling detection of water. In a particular embodiment, the equations for calculating the correlation between a window O containing an object and a window R containing a reflection of the object are shown in equations (6-8), where $I_{i,j}$ is the image intensity at pixel (i, j), N×N is the size of both windows, $(r_o, c_o)$ are the image coordinates of the center of O, $(r_r, c_r)$ are the image coordinates of the center of R, $I_O$ is the mean intensity of O, $I_R$ is the mean intensity of R, and C is the correlation value.

$$I_O = \left[\sum_{i=0}^{N}\sum_{j=0}^{N} I_{r_o-N/2+i, c_o-N/2+j}\right]/N \tag{6}$$

$$I_R = \left[\sum_{i=0}^{N}\sum_{j=0}^{N} I_{r_r-N/2+i, c_r-N/2+j}\right]/N \tag{7}$$

$$C = \frac{\sum_{i=0}^{N}\sum_{j=0}^{N}[(I_{r_r+N/2-i, c_r-N/2+j} - I_R)(I_{r_o-N/2+i, c_o-N/2+j} - I_o)]}{\sqrt{\sum_{i=0}^{N}\sum_{j=0}^{N}(I_{r_r+N/2-i, c_r-N/2+j} - I_R)^2} \sqrt{\sum_{i=0}^{N}\sum_{j=0}^{N}(I_{r_o-N/2+i, c_o-N/2+j} - I_o)^2}} \tag{8}$$

Cross correlation can be utilized to detect water in a variety of ways in accordance with embodiments of the invention. In one embodiment, cross correlation can be used as the basis of a stand-alone detector. In additional embodiments, cross correlation can be used as a method to confirm stereo reflection detection results. In further embodiments, cross correlation can be used to detect object reflections where the stereo reflection detector cannot be used, (i.e., where there is no stereo range data).

In many embodiments cross correlation is used as a stand-alone water detector where cross correlation can search an entire image for a reflection in any portion of the image. However, in many embodiments, it would be computationally expensive to search the entire space above the horizon for a match for each mask position below the horizon, giving way to a limited, more effective search. The equations in (5) are used to calculate expected 3D reflection coordinates, given the 3D coordinates of a point object and the elevation of a water body. Certain embodiments calculate the expected 3D coordinates of a point object, given the 3D coordinates of a candidate reflection and an estimate of the water body's elevation as indicated in the equations in (9). The 3D coordinates of a point object or reflection can be converted to 2D image coordinates using a camera's CAHV model.

$$x_o = x_r$$

$$y_o = y_r$$

$$z_o = 2H - z_r \tag{9}$$

Figure 11:
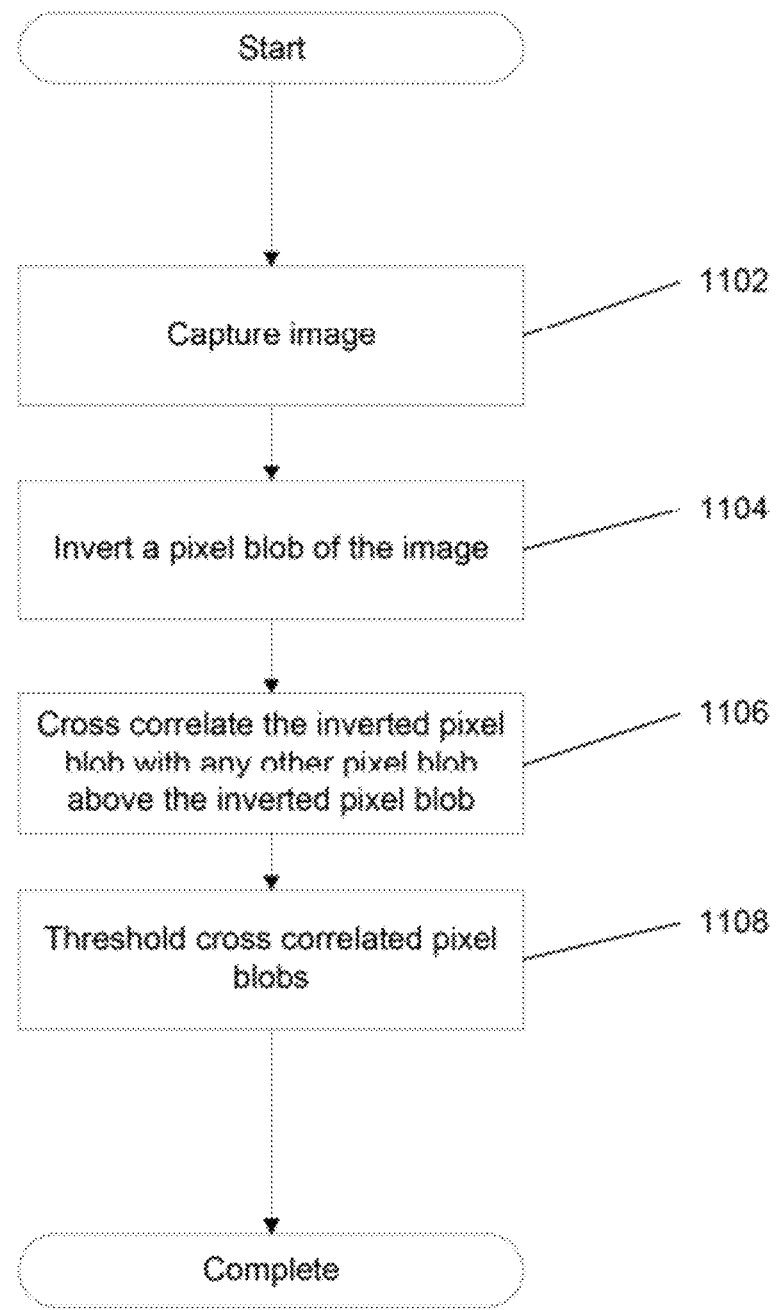
FIG. 11 illustrates a process for automated water detection based upon cross correlation reflection detection of object reflections in accordance with an embodiment of the invention.

In many embodiments, cross correlation can be used to confirm or reject stereo reflection detection. For every pixel detected as a stereo reflection, the 2D image coordinates of where the reflecting object is found can be calculated and determined if there is corroborating evidence with cross correlation. A process for cross correlation reflection detection in accordance with an embodiment of the invention is illustrated in FIG. 11. The process 1100 includes capturing (1102) an image. After the image is captured (1102), a blob of pixels within the image is inverted (1104). After inverting (1104) a pixel blob, the inverted pixel blob is cross correlated (1106) with any other pixel blob above the inverted pixel blob. After cross correlation (1106), the cross correlation of the pixel blobs are thresholded (1108).

In several embodiments, cross correlation can be used to detect object reflections where stereo reflection detection cannot be used. There may be times when a water body is too small in the stereo disparity image to survive disparity blob size filtering. Disparity blob size filtering takes out artifacts of an image that are likely to be noise when reconstructing a 3D image from 2D stereo images due to the small size and incongruous nature of the artifacts to the rest of an image. When this occurs, there will be no stereo range data on the water body. A blob is an arbitrary collection of pixels in an image.

In many embodiments, detecting water bodies too small for a stereo disparity image to survive disparity blob size filtering includes extracting the blobs of no data in the stereo range image. After extracting the blobs of no data, the blobs of no data are filtered to remove the blobs that are not good candidates for water. This filtering can include (but is not limited to) thresholding blob size, aspect ratio, and the delta height of the boundary of each blob. After filtering, for the blobs that remain, cross correlation above each candidate blob region is performed, labeling the pixels having a high positive cross correlation value. In certain embodiments, a correlation value of 0.7 or 70% correlation is used. After cross correlation, the number of high positive cross correlation pixels and the vertical variance of the pixels with high positive cross correlation are then thresholded.

In addition to object reflections based upon stereo reflection detection and cross correlation, both of which are detections in an image space, object reflection detection of water can also be performed in a map space. The term map space indicates an image that includes a map of an entire scene. One key assumption the map based reflection detector is the entire water body is within the sensor's FOV. In certain embodiments, a map is constructed and maintained by the water detection system by merging each new stereo range image to form a digital elevation map (DEM).

Small water bodies at a far range from the sensor usually include a range void where the small water body exists. For example, if the range is measured with an active range finder, such as a LIDAR sensor, the incidence angle is so large that the laser light reflects off the water surface and there is either no return signal or the return signal is too weak to be detected. With stereo image sensors, the size of a small water body in image space may be small enough to cause it to be removed by a disparity blob size filter. But as a sensor approaches a small water body, range data will begin to appear on the water pixels at some point. One reason for this is at lower incidence angles, there may be laser light returns off the bottom of a shallow water body, sediment in the water, or the surface of the water. And once the disparity blob on the water pixels is larger than the minimum size threshold, it will be retained. In addition, with both sensors, range data on a water body can correspond to object reflections. In both active range finders such as LIDAR and stereo range data, the range to the object reflected in a water body is always larger than the range to the water's surface.

Figure 12:
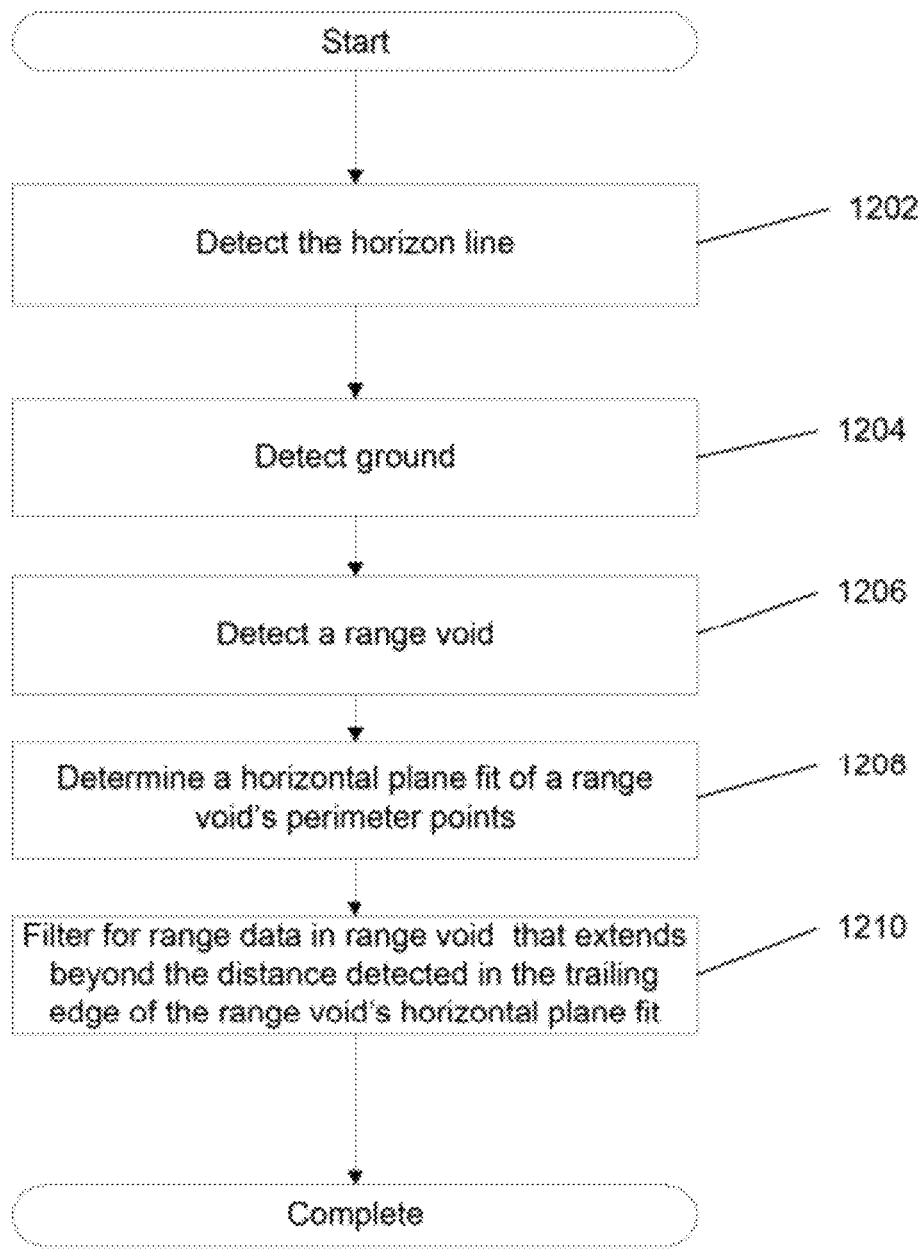
FIG. 12 illustrates a process for automated water detection based upon map based reflection detection of object reflections in accordance with an embodiment of the invention.

Many embodiments exploit this phenomenon by implementing map based reflection detection tailored for detecting small water bodies. A process for object reflection detection in map space in accordance with an embodiment of the invention is illustrated in FIG. 12. The process 1200 includes detecting (1202) the horizon line. After the horizon line is detected (1202), the ground is detected (1204). After the ground is detected (1204), a range void is detected (1206). After detecting (1206) a range void, a horizontal plane fit of a range void's perimeter points is determined (1208). After determining (1208) a horizontal plane fit, range data in the range void that extends beyond the distance detected in the trailing edge of the range void's horizontal plane fit are filtered out (1210).

Many embodiments include the analysis of range voids. A range void is part of an image of a detected scene where there is no range or distance information for that part of the image. One key characteristic of water bodies is that their surface is always level. If a plane fit of a range void's perimeter points is relatively horizontal, the range void can be labeled as a candidate water region. If the range data was derived from stereo cameras, cross correlation can be performed in the rectified left image as a cue for water.

In several embodiments, object reflections are detected in a map based reflection where range data penetrates the surface of a candidate water region and extends beyond the far edge of the candidate water region. If the range data is from an active range sensor such as LIDAR, object reflections are also detected when range data falls on the surface of a candidate water region at closer range. A strong cue that there is a reflective surface is when the surface of a hole fills in with range data as it is approached.

Although specific types of object reflection water detection are discussed above, many different processes for performing object reflection based water detection can be utilized depending upon the requirements of specific applications in accordance with embodiments of the invention. The accuracy of water detection can be further enhanced beyond various processes tailored to detect water in different environments by filtering out candidate water false positives in accordance with embodiments of the invention, which is discussed further below.

Filtering Out False Positives

Figure 13:
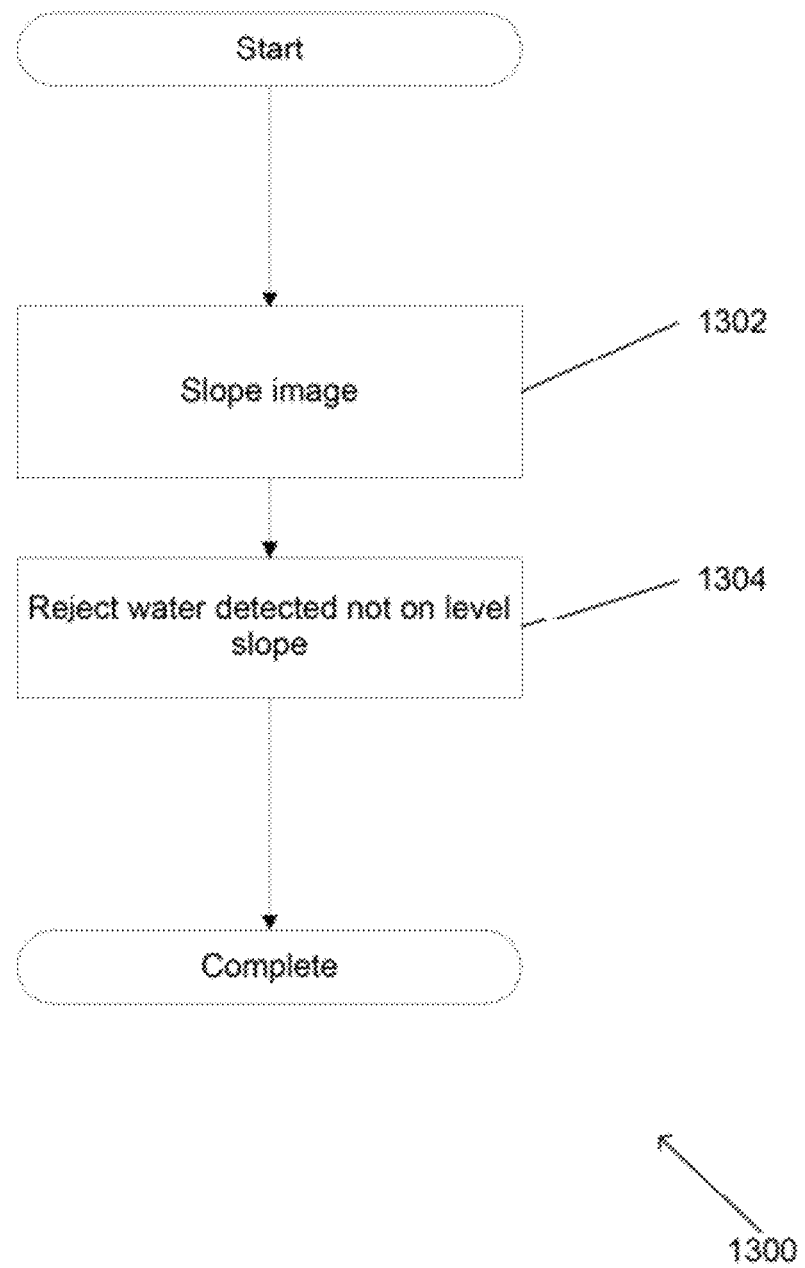
FIG. 13 illustrates a process for filtering out candidate water false positives by analyzing the slope of candidate water bodies in accordance with an embodiment of the invention.

Despite the implementation of effective processes for water detection, certain detections can arise that are false positives that should be filtered out of any final water detection results. The determination of the filters that are utilized in the water detection process can be tailored to address particular defects in water detection or unique environments where water detection is particularly difficult. False positive water detection can occur on objects or terrain that has a color similar to the sky or high reflectivity. For example, white vehicles, cement pavement, and sun glare all have color components similar to an overcast sky. Filtering for these situations, such as bright vehicles and other 3D objects with similar colors or that also reflect the sky can be rejected by thresholding their slope, which can be estimated using stereo range data. A process for filtering out slopes of detected water as false positives in accordance with an embodiment of the invention is illustrated in FIG. 13. The process 1300 includes sloping (1302) an image by determining the slope value of each of the pixels in the image. After generating (1302) a slope image by slopping the image, all water detections that are not on a level slope are filtered out (1304) and rejected. Similarly, reflections from sun glare can also be detected since glare is characterized by one or more rays of image saturation extending from the sun to the bottom of the image. In certain embodiments, water detection filters out or skips images where sun glare is detected.

In yet other embodiments, false positives are filtered out if greater than a threshold amount, such as 75% in certain embodiments, of the pixels detected as a water body were also detected as ground surface, then the water detection is filtered out as a false positive. Many embodiments utilize sky detection for defining the search space for water bodies reflecting the sky. Ground pixels with colors similar to the sky can be filtered out and rejected if they fall outside of the ground space that can reflect the sky. In certain embodiments, false positives classified as where the portion of the ground cannot reflect the sky, such as ground that is obscured from the sky is filtered out. Many other embodiments rely on a positive water detection as one that is confirmed among a plurality of water detection processes. For example, certain embodiments filter out water only detected by one or no water detection process and only allow water detection to pass muster if the water body is detected by more than one water detection process. A variety of embodiments also ensure that filtering inappropriate for water detection is not active when detecting water. In certain embodiments, filtering out the disparity data in a stereo camera, such as post filtering stereo disparity data including (but not limited to) filtering based on region size and gradient, can be turned off to ensure greater accuracy of water detection in certain applications.

In various embodiments, a camera's automatic gain control (AGC) can cause image saturation when a sensor enters a shadowy or darker region. The combination of high luminance, low texture, and low terrain slope can cause false positive water detection. Many embodiments performing filtering out of environments that are classified as false positives if the mean intensity in the lower half of the image decreases but the blue content increases. This filtering is used assuming that the sensor has entered into a shadow and can ignore any image saturation above the shadow. Numerous embodiments filter out false positives that are classified as any image saturation when the sky is blue as water is typically not saturated under a clear (blue) sky. A number of embodiments filter out false positives that are classified when the intensity of a region significantly increases over time as the region is approached. This filtering is made under the assumption that a water body typically becomes darker as it is approached because the color coming out of the water body starts to dominate reflections from the sky.

Although specific types of filtering for false positives are discussed above, many other types of filtering for false positives can be implemented in accordance with embodiments of the invention including filtering across images taken where water was not detected in past images taken of the scene, while a current image indicated water detection.

In addition to filtering out false positives, further accuracy can be achieved by localizing candidate water bodies. Localization of candidate water bodies in accordance with embodiments of the invention is discussed further below.

Localization of Candidate Water Bodies

Figure 14:
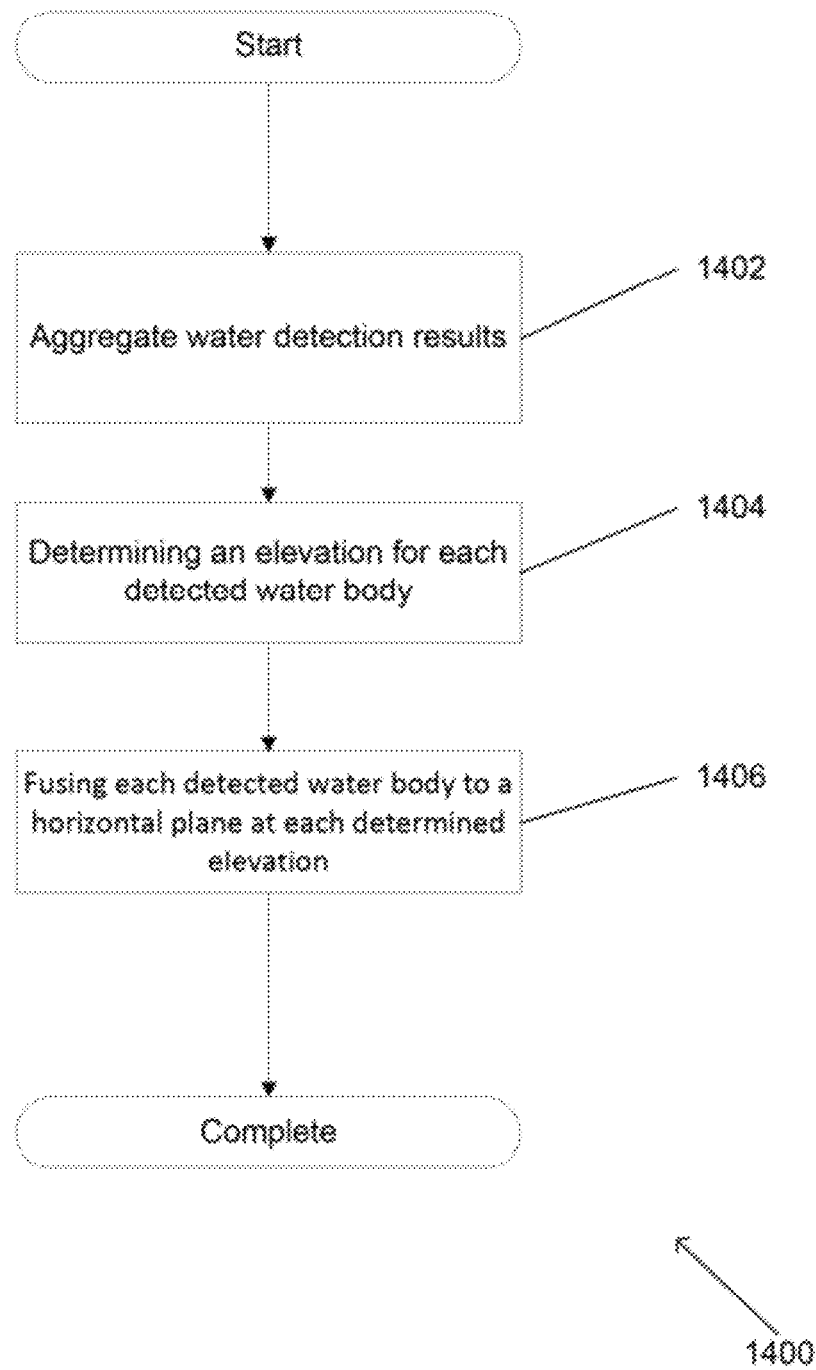
FIG. 14 illustrates a process for localization of water candidates in accordance with an embodiment of the invention.
Figure 9A:
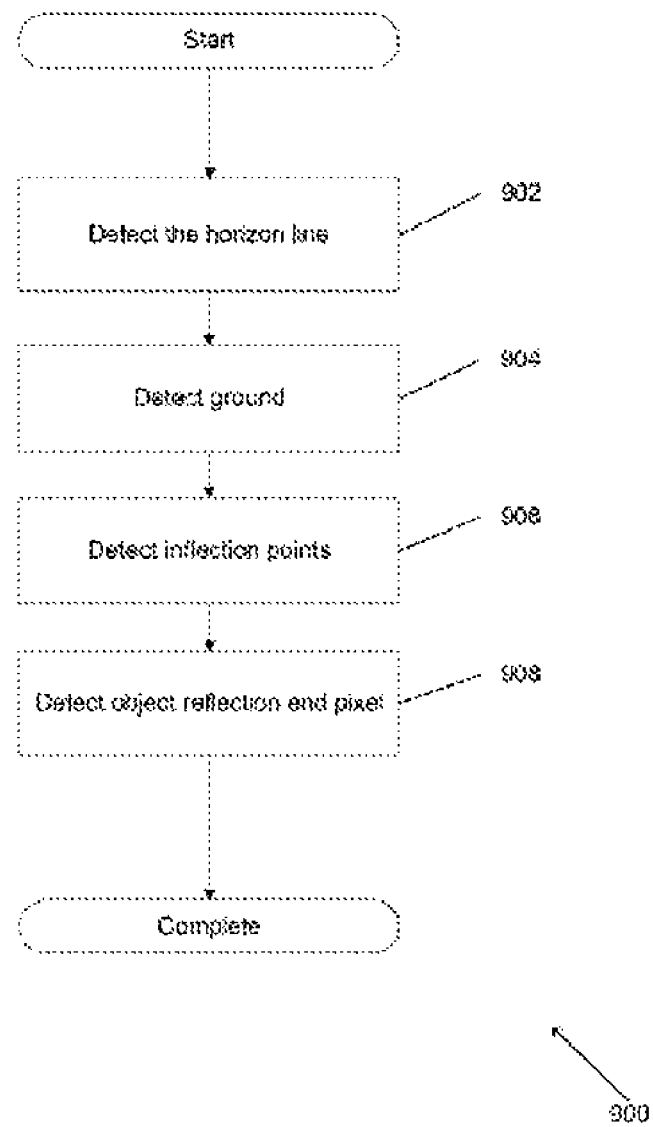

Once candidate water bodies are detected, they can be localized for further accuracy by taking advantage of natural features of water bodies, such as an even elevation. In many embodiments, the elevations of the perimeter pixels around candidate water bodies are averaged to yield an estimate of water body elevation for each respective candidate water body. Estimated water body elevation is used to modify the 3D coordinates of the detected stereo reflections so they coincide with the surface of the water. A process for water detection that adds additional accuracy by combining several water detection results in accordance with an embodiment of the invention is illustrated in FIG. 14. The process 1400 includes aggregating (1402) water detection results. After water detection results are aggregated (1402), an elevation for each detected water body is determined (1404). After determining (1404) the water body elevation for each water body, the water detection results are fused (1406) to a horizontal plane at each determined elevation.

3D reconstruction, including stereo reconstruction, of water surfaces can be complicated by water's reflectance and refractive nature. Due to the transparent and dynamic nature of water, range data associated with detected water bodies may not be precisely at ground level, or the water body may not rest exactly at the elevation found from a single 3D image. Also, as water is typically low texture, there will be no stereo range data on the portions that are not reflecting objects. Thereby, certain embodiments do not use directly use range data for the pixels associated with a detected body of water to determine the elevation of water.

In many embodiments, many different types of water detection processes can be utilized by aggregating each of their water detection results. In certain embodiments, all water detection results are aggregated while in other embodiments only some of the water detection results are aggregated.

In various embodiments, determination of an elevation for each detected water body is taken directly from 3D data related to the water body or from averaging the 3D points adjacent to a detected water body. It is possible that not all of the water detection results have 3D coordinate information, such as an elevation and distance from the sensor. For pixels in a water detection region that do not have 3D coordinates, elevation can be determined using an estimated elevation and/or distance from the sensor. An estimated elevation can be found by averaging the elevation and/or distance from 3D coordinates of nearby regions to the pixels without 3D coordinates. For pixels in a region of detected water with 3D coordinates, the determined elevation can be determined directly from the 3D coordinates. However, in other embodiments, determining the elevation of pixels in a region of detected water already with 3D coordinates is determined by estimating elevation, such as by averaging the 3D data or elevation of nearby regions to the pixels with 3D coordinates.

In several embodiments, fusing each detected water body to a horizontal plane at each determined elevation generates a detected water body that spans multiple water detection results or expands a detected water body at the same determined elevation. Thereby, failure to detect pixels in a body of water that would not have been detected or improperly detected as not part of a water body can be fused with pixels of a detected water body to create more accurate water detection. In numerous embodiments, water body detection is merged onto a map. As estimated elevations used in elevation determination can contain a modicum of error, subsequent detections of the same water body can update an estimate of a detected water body's elevation and shift the detection of the water body to the updated determined water body elevation in the map.

In many embodiments, plane fitting of water detection results allows for consolidation of water detections based on many of water's characteristics, including water's tendency to be on a level plane of equal elevation. Certain embodiments can filter non level water detections in a filtering step to ensure that detected water is on a level plane. In many embodiments, water detection results are fused or combined with each other if they lie close to each other on a same plane. For example, water detection from sky reflections can be fused with water detection from object reflections that lie close to each other on the same plane. Thereby, a body of water detected may be a lake with a portion of the water surface reflecting objects and a portion of the lake surface reflecting the sky. Also, a detected body of water can be a lake with only parts of the water exhibiting reflective properties, where the parts of the water exhibiting reflective properties can be fused with water detection at the same determined elevation to yield localized and more accurate water body detection. Although specific types of water localization are discussed above, other types of water localization can be utilized in accordance with embodiments of the invention.

While the above description contains many specific embodiments of the invention, these should not be construed as limitations on the scope of the invention, but rather as an example of one embodiment thereof.

What is claimed is:

1. A method of autonomously detecting water bodies within a scene comprising:
    capturing at least one 3D image of a scene using a sensor system configured to detect visible light and to measure distance from points within the scene to the sensor system;
    detecting candidate water within the scene using a processor configured to detect regions within each of the at least one 3D images that possess at least one characteristic indicative of the presence of water;
    filtering out false positives from the candidate water using the processor, where the false positives comprise a pixel of candidate water with a non-level slope value; and
    localizing the detected water using the processor, where the processor is further configured to aggregate water detections by:
        aggregating at least one detected water body on an image;
        finding an elevation for each detected water body; and
        fusing each detected water body to a horizontal plane in a 3D reconstruction of the scene at the elevation.

2. The method of claim 1, wherein the at least one characteristic indicative of the presence of water is at least one of sky reflections, object reflections or color variations.

3. The method of claim 2, wherein detecting water within the scene using a processor configured to detect regions within each of the at least one 3D images that possess color variations comprises:
    detecting the horizon line in each of the at least one 3D images;
    detecting the ground in each of the at least one 3D images;
    detecting at least one low texture region with a monochrome intensity above a monochrome intensity threshold on the ground;
    expanding the low texture regions where the intensity gradient is at an expansion threshold;
    fitting each low texture region to a shape approximating the outline of a body of water encompassing the low texture region; and
    line fitting the pixels within each low texture region for lines representing the changes in color levels with varying distances from the ground to the sensor in both saturation and brightness.

4. The method of claim 3, further comprising thresholding the line fitting for differences between the saturation and the brightness lines for the rates of change in color level with varying distance on the ground from the sensor.

5. The method of claim 3, further comprising thresholding at least one of:
    size of the low texture regions;
    type of the shape approximating the outline of a body of water;
    pixel density within the shape;
    dimensions of the shape;
    slope of the lines from line fitting of the pixels in each low texture region; or
    error of the line fitting of the pixels in each low texture region.

6. The method of claim 3, wherein at least one of:
    the expanding the low texture regions is performed by flood filling;
    the shape approximating the outline of a body of water is shaped as an ellipse; and
    the line fitting is performed by least squares line fitting.

7. The method of claim 2, wherein detecting water within the scene using a processor configured to detect regions within each of the at least one 3D images that possess sky reflections comprises:
    detecting the horizon line in each of the at least one 3D images;
    detecting the sky in each of the at least one 3D images;
    detecting the ground in each of the at least one 3D images; and
    comparing pixels from the ground to pixels in the sky.

8. The method of claim 7 further comprising thresholding a degree of similarity between the compared ground and sky pixels.

9. The method of claim 7, wherein comparing pixels from the ground to pixels in the sky comprises:
    averaging the lower sky pixels in each image column; and
    scanning for pixels on the ground for color that is similar to the averaged sky color.

10. The method of claim 7, wherein the comparing pixels from the ground to pixels in the sky comprises:
    geometrically locating pixels in the sky that pixels on the ground can be reflecting; and
    comparing the pixels on the ground to the corresponding pixels in the sky for similarity.

11. The method of claim 2, wherein detecting water within the scene using a processor configured to detect regions within each of the at least one 3D images that possess object reflections comprises:
    detecting the horizon line in the at least one 3D images;
    detecting the ground in the at least one 3D images;
    detecting inflection points on the ground; and
    detecting object reflection end pixels on the ground.

12. The method of claim 2, wherein detecting water within the scene using a processor configured to detect regions within each of the at least one 3D images that possess object reflections comprises:
    detecting the horizon line in the at least one 3D images;
    detecting the ground in the at least one 3D images; and
    detecting zero disparity pixels on the ground.

13. The method of claim 2, wherein detecting water within the scene using a processor configured to detect regions within each of the at least one 3D images that possess object reflections comprises:
    inverting a pixel blob of the at least one 3D images; and
    cross correlating the inverted pixel blob with any other pixel blob above the inverted pixel blob.

14. The method of claim 2, wherein detecting water within the scene using a processor configured to detect regions within each of the at least one 3D images that possess object reflections comprises:
    detecting the horizon line in each of the at least one 3D images;
    detecting the ground in each of the at least one 3D images;
    detecting at least one range void on the ground;
    determining a horizontal plane fit for each range void's perimeter points; and
    filtering out portions of each range void that extend beyond the distance detected in the trailing edge of the range void's horizontal plane fit.

15. A method of autonomously detecting water bodies within a scene comprising:
- capturing at least one 3D image of a scene using a sensor system configured to detect visible light and to measure distance from points within the scene to the sensor system;
- detecting candidate water within the scene using a processor configured to detect regions within each of the at least one 3D images possessing color variations, wherein detecting water further comprises:
  - detecting the horizon line in a plurality of the at least one 3D images;
  - detecting the ground in a plurality of the at least one 3D images;
  - detecting at least one low texture region with a monochrome intensity above a monochrome intensity threshold on the ground in at least one of the 3D images;
  - flood filling the low texture regions where the intensity gradient is at an expansion threshold;
  - fitting each low texture region to an ellipse approximating the outline of a body of water encompassing the low texture regions;
  - least squares line fitting the pixels in each low texture region in saturation and brightness from certain color levels at varying distance on the ground from the sensor;
  - filtering out false positives from the candidate water by configuring the processor to avoid detecting the false positives, where the false positives comprise a pixel candidate of water with a non-level slope; and
  - localizing the detected water by configuring the processor to aggregate water detections, where the processor is further configured to aggregate the water detections by:
    - aggregating at least one detected water body on an image;
    - finding an elevation for each detected water body; and
    - fusing each detected water body to a horizontal plane in a 3D reconstruction of the scene at the elevation.

16. A system for autonomously detecting water bodies within a scene comprising:
- a sensor system configured to capture at least one 3D image of a scene, wherein the sensor system is configured to detect visible light and to measure distance from points within the scene to the sensor system; and
- a processor configured to:
  - detect candidate water within the scene by detecting regions of pixels within each of the at least one 3D images that possess at least one characteristic indicative of the presence of water;
  - filter out the false positives from the candidate water, where the false positives comprise a pixel of candidate water with a non-level slope value; and
  - localize the detected water by aggregating water detections, where the processor is further configured to aggregate the water detections by:
    - aggregating at least one detected water body on an image;
    - finding an elevation for each detected water body; and
    - fusing each detected water body to a horizontal plane in a 3D reconstruction of the scene at the elevation.

* * * * *

UNITED STATES PATENT AND TRADEMARK OFFICE
CERTIFICATE OF CORRECTION

Page 1 of 2

PATENT NO. : 9,460,353 B2
APPLICATION NO. : 13/235280
DATED : October 4, 2016
INVENTOR(S) : Arturo L. Rankin, Larry H. Matthies and Paolo Bellutta It is certified that error appears in the above-identified patent and that said Letters Patent is hereby corrected as shown below:

On Drawing Sheet 11 of 17, replace FIG. 9A with the corrected FIG. 9A as shown on the attached sheet.

Signed and Sealed this
Twenty-seventh Day of December, 2016

Michelle K. Lee
*Director of the United States Patent and Trademark Office*